United States Patent
Spoelstra et al.

(10) Patent No.: US 11,514,494 B2
(45) Date of Patent: Nov. 29, 2022

(54) TELECOMMUNICATIONS PRODUCT DEFINING AND PROVISIONING

(71) Applicant: DGIT CONSULTANTS PTY LTD, Melbourne (AU)

(72) Inventors: Mark Alun Spoelstra, Melbourne (AU); Frankie Wing Kee Wong, Melbourne (AU); Allan Grant Randall, Melbourne (AU); Michael James Hanrahan, Melbourne (AU); Gregory Scott Tilton, Melbourne (AU); Douglas Gordon Nixon, Melbourne (AU)

(73) Assignee: DGIT Consultants Pty Ltd., Melbourne (AU)

( * ) Notice: Subject to any disclaimer, the term of this patent is extended or adjusted under 35 U.S.C. 154(b) by 754 days.

(21) Appl. No.: 15/315,966

(22) PCT Filed: Jun. 1, 2015

(86) PCT No.: PCT/AU2015/050296
§ 371 (c)(1),
(2) Date: Dec. 2, 2016

(87) PCT Pub. No.: WO2015/184497
PCT Pub. Date: Dec. 10, 2015

(65) Prior Publication Data
US 2017/0124617 A1 May 4, 2017

Related U.S. Application Data

(60) Provisional application No. 62/006,394, filed on Jun. 2, 2014.

(51) Int. Cl.
*G06Q 30/06* (2012.01)
*G06F 16/958* (2019.01)

(52) U.S. Cl.
CPC ....... *G06Q 30/0621* (2013.01); *G06F 16/958* (2019.01); *G06Q 30/0633* (2013.01)

(58) Field of Classification Search
CPC ..... G06F 8/35; G06F 8/38; G06F 8/10; G06F 8/30; G06F 8/73; G06F 16/958; G06Q 30/0621; G06Q 30/0633
See application file for complete search history.

(56) References Cited

U.S. PATENT DOCUMENTS 6,185,583 B1   2/2001   Blando
7,844,529 B2 * 11/2010  Ziade ............... G06Q 40/00
                                                 705/36 R (Continued)

FOREIGN PATENT DOCUMENTS

CA   2344074      10/2002
WO   2013009585   1/2013

OTHER PUBLICATIONS

Dong, Ming, Dong Yang, and Liyue Su. "Ontology-based service product configuration system modeling and development." Expert systems with applications 38.9 (2011): 11770-11786. (Year: 2011).*

(Continued)

*Primary Examiner* — Nathan A Mitchell

(57) ABSTRACT

A computer-implemented process for defining a telecommunications product in accordance with a predefined schema, the process including the steps of: receiving, via a user interface, a request from a user for a specification for the telecommunications product; receiving, via the user interface, characteristics data representing one or more characteristics for the specification from the user, including a plurality of properties for at least one of the characteristics; receiving, via the user interface, input rules data representing at least one rule for the specification, including: a selection of at least one of the received characteristics to provide a condition characteristic for the rule to operate, a (Continued)

selection of a rule type to define operation of the rule, and a selection of at least one of the received characteristics to provide a target characteristic on which the rule will operate; and processing the characteristics data and the input rules data, according to the predefined schema, to generate specification data representing the characteristics, and output rules data, representing the rules, such that the characteristics data and the output rules data are useable together to: generate order interface data, representing an order interface for a customer to request the product, including one or more of the properties, and generate product component data representing product components of the requested product, based on the predefined schema, for provisioning the product.

12 Claims, 17 Drawing Sheets

(56) References Cited

U.S. PATENT DOCUMENTS

| | | | | |
|---|---|---|---|---|
| 7,941,438 | B2* | 5/2011 | Molina-Moreno | G06F 8/35 707/756 |
| 8,627,490 | B2* | 1/2014 | Lim | G06F 21/6227 726/27 |
| 9,754,303 | B1* | 9/2017 | Jagtap | G06Q 30/0603 |
| 9,858,559 | B2* | 1/2018 | Raleigh | G06Q 40/12 |
| 9,973,533 | B2* | 5/2018 | Lim | G06F 21/51 |
| 2005/0071254 | A1 | 3/2005 | Aboujaoude et al. | |
| 2005/0209903 | A1* | 9/2005 | Hunter | G06Q 10/10 705/7.26 |
| 2007/0129987 | A1 | 6/2007 | Hauser et al. | |
| 2008/0052136 | A1* | 2/2008 | Ziade | G06Q 40/00 705/4 |
| 2008/0243629 | A1* | 10/2008 | Chang | G06Q 10/06 705/26.8 |
| 2008/0275910 | A1* | 11/2008 | Molina-Moreno | G06F 16/2365 |
| 2009/0037254 | A1 | 2/2009 | Colando | |
| 2011/0066934 | A1* | 3/2011 | Treisman | G06F 40/174 715/222 |
| 2012/0290940 | A1* | 11/2012 | Quine | G06F 16/212 715/744 |
| 2013/0097478 | A1 | 4/2013 | Allison et al. | |
| 2013/0304616 | A1* | 11/2013 | Raleigh | H04M 15/66 705/34 |
| 2014/0075279 | A1* | 3/2014 | Issa | G06F 40/174 715/221 |
| 2015/0379442 | A1* | 12/2015 | Samanthapudi | G06Q 30/0621 705/7.27 |
| 2019/0147518 | A1* | 5/2019 | Soderlund | G06Q 30/0621 705/26.5 |
| 2019/0171703 | A1* | 6/2019 | Evans | G06F 40/186 |
| 2020/0043070 | A1* | 2/2020 | Ketchel, III | G06Q 30/0633 |
| 2020/0045519 | A1* | 2/2020 | Raleigh | H04W 4/24 |

OTHER PUBLICATIONS

Tiihonen, Juha, et al. "A practical tool for mass-customising configurable products." DS 31: Proceedings of ICED 03, the 14th International Conference on Engineering Design, Stockholm. 2003. (Year: 2003).*
Supplementary European Search Report for EP Application No. 15 80 3870 dated Sep. 17, 2017 (14 pages).
International Search Report for International Application No. PCT/AU2015/050296 dated Aug. 24, 2015 (5 pages).
Search Information Statement (SIS) from Australian Patent Office for PCT/AU2015/050296 completed Aug. 24, 2015 (2 pages).

* cited by examiner

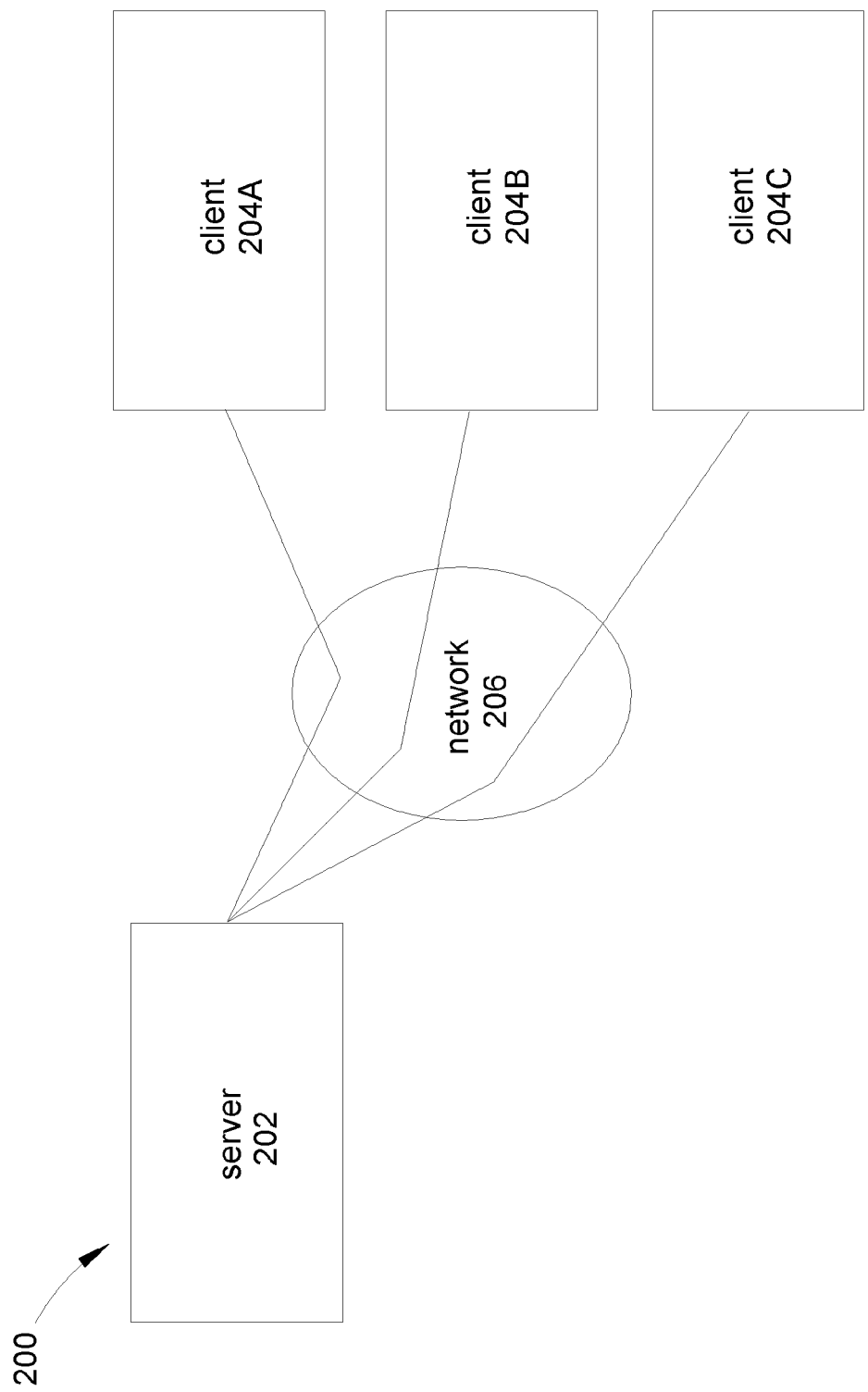

Figure 8

○ TELFLOWPORTAL~ | Dashboard Qualification Inventory | Orders | Create ▾ | Manage ▾

New Product Order
Complete ORD000000002514 / Kube
[Configuration] Activity ③ Fulfillment B2B

Product Configuration

NETWORK ACCESS

| | | |
|---|---|---|
| Access Provider | NBN Co | Data Rate | 100/40 |
| NDT Port ID | Auto Select | Handoff Type | Entire Port |

VIRTUAL DATA CENTRE

| | | |
|---|---|---|
| Virtual Data Centre | Create New | Provisioning Template | Web Server |

NEW VIRTUAL DATA CENTRE

| | | |
|---|---|---|
| Data Centre Name | Posco Data Centre | Network Type | Private + Public |
| Scaling Factor | Scale Early | | |

CLOUD STORAGE

| | | |
|---|---|---|
| Storage Name | Dell | Storage Type | Elastic |

CLOUD SOFTSWITCH

| | | |
|---|---|---|
| Softswitch Name | San Co | Softswitch Vendor | Broadsoft |
| Scaling Factor | Small | Number Range | undefined |

Figure 12

TELECOMMUNICATIONS PRODUCT DEFINING AND PROVISIONING

This application is a National Stage Application of PCT/AU2015/050296, filed 1 Jun. 2015, which claims benefit of U.S. Provisional Ser. No. 62/006,394, filed 2 Jun. 2014 and which applications are incorporated herein by reference. To the extent appropriate, a claim of priority is made to each of the above disclosed applications.

BACKGROUND

In the past, telecommunications services were provided to customers by single entities, e.g., Telecom in Australia, or AT&T in the USA, or Post Office Telecommunications in the UK. These single entities defined and provided most or all of the technology required to provide a service, e.g., a telephone connection.

In recent times, however, telecommunications products have become increasingly complicated, including a plurality of different and separated product components: (1) a physical communications network, (2) data transport or networking equipment, (3) applications that communication with customers to provide services, and (4) cloud infrastructure that is flexibly accessed through a network, e.g., platforms for the applications. Each product component may be configured in many different ways. For any given product, it may be necessary to ensure that the different product components perform within certain pre-defined parameters (e.g., network speed for certain applications, etc.).

As a consequence of this recent, and on-going, splintering of the components for each telecommunications product, there is an increasing need for tools that allow telecommunications products to be defined and provisioned rapidly, efficiently and reliably.

It is desired to address or ameliorate one or more limitations or disadvantages of the prior art, e.g., including those outlined above; or to at least provide one or more useful alternatives.

SUMMARY

In accordance with the present invention, there is provided a computer-implemented process for defining a telecommunications product in accordance with a predefined schema, the process including the steps of:

receiving, via a user interface, a request from a user for a specification for the telecommunications product;

receiving, via the user interface, characteristics data representing one or more characteristics for the specification from the user, including a plurality of properties for at least one of the characteristics;

receiving, via the user interface, input rules data representing at least one rule for the specification, including:

a selection of at least one of the received characteristics to provide a condition characteristic for the rule to operate, a selection of a rule type to define operation of the rule, and a selection of at least one of the received characteristics to provide a target characteristic on which the rule will operate; and processing the characteristics data and the input rules data, according to the predefined schema, to generate specification data representing the characteristics, and output rules data, representing the rules, such that the characteristics data and the output rules data are useable together to:

generate order interface data, representing an order interface for a customer to request the product, including one or more of the properties, and generate product component data representing product components of the requested product, based on the predefined schema, for provisioning the product.

The present invention also provides process for provisioning a telecommunications product, including the process above and the steps of:

generating the order interface data; and generating the product component data representing the product components.

The present invention also provides a process including steps of:

generating specification data representing one or more specification documents, each including a plurality of fillable data fields, and rules data representing an associated rules document including rules for filling the fillable data fields, using user input from a user;

storing the specification data separately from the rules data; and generating instance data representing an instance document including data filled into the fillable data fields based on user input and data generated by processing the rules in a rules engine.

The present invention also provides a provisioning system having components configured to execute the processes above.

The present invention also provides non-transitory storage with computer-readable instructions configured to implement the processes above.

The present invention also provides a system, including:

a composer module that generates specification data representing one or more specification documents, each including a plurality of fillable data fields, and rules data representing an associated rules document including rules for filling the fillable data fields, using user input from a user;

a specification module that stores the specification data separately from the rules data; and a rendering engine, including a rules engine, that generates instance data representing an instance document including data filled into the fillable data fields based on user input and data generated by processing the rules in the rules engine.

BRIEF DESCRIPTION OF THE FIGURES

Preferred embodiments of the present invention are hereinafter described, by way of example only, with reference to the accompanying drawings, in which:

FIG. 2 is a schematic diagram of hardware components of the system;

Figure 8:
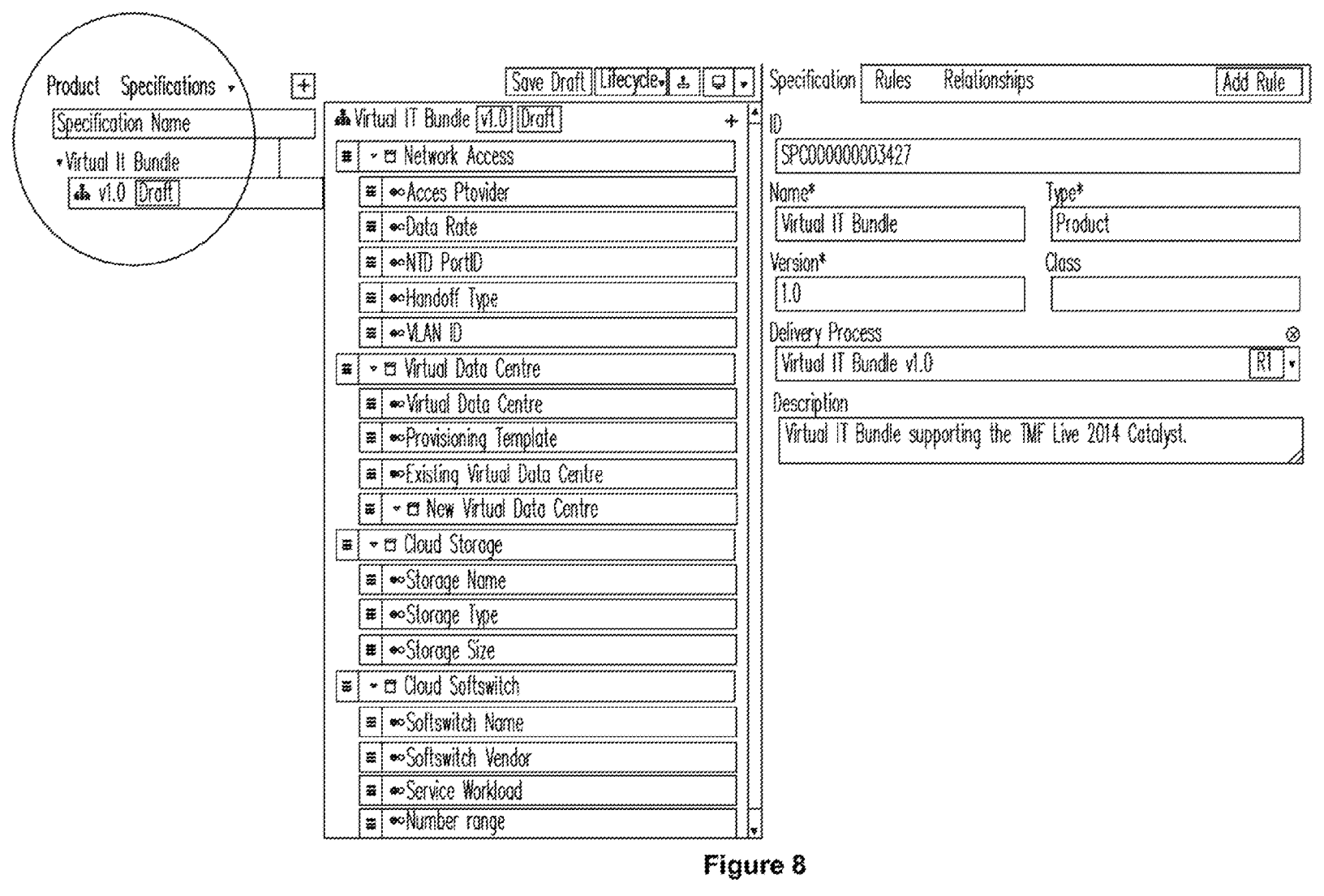

FIGS. 7-11 are screen shots of a design user interface of the product provisioning system;

FIG. 12 is a screen shot of an order user interface of the product provisioning system.

DETAILED DESCRIPTION

Overview

Figure 1A:
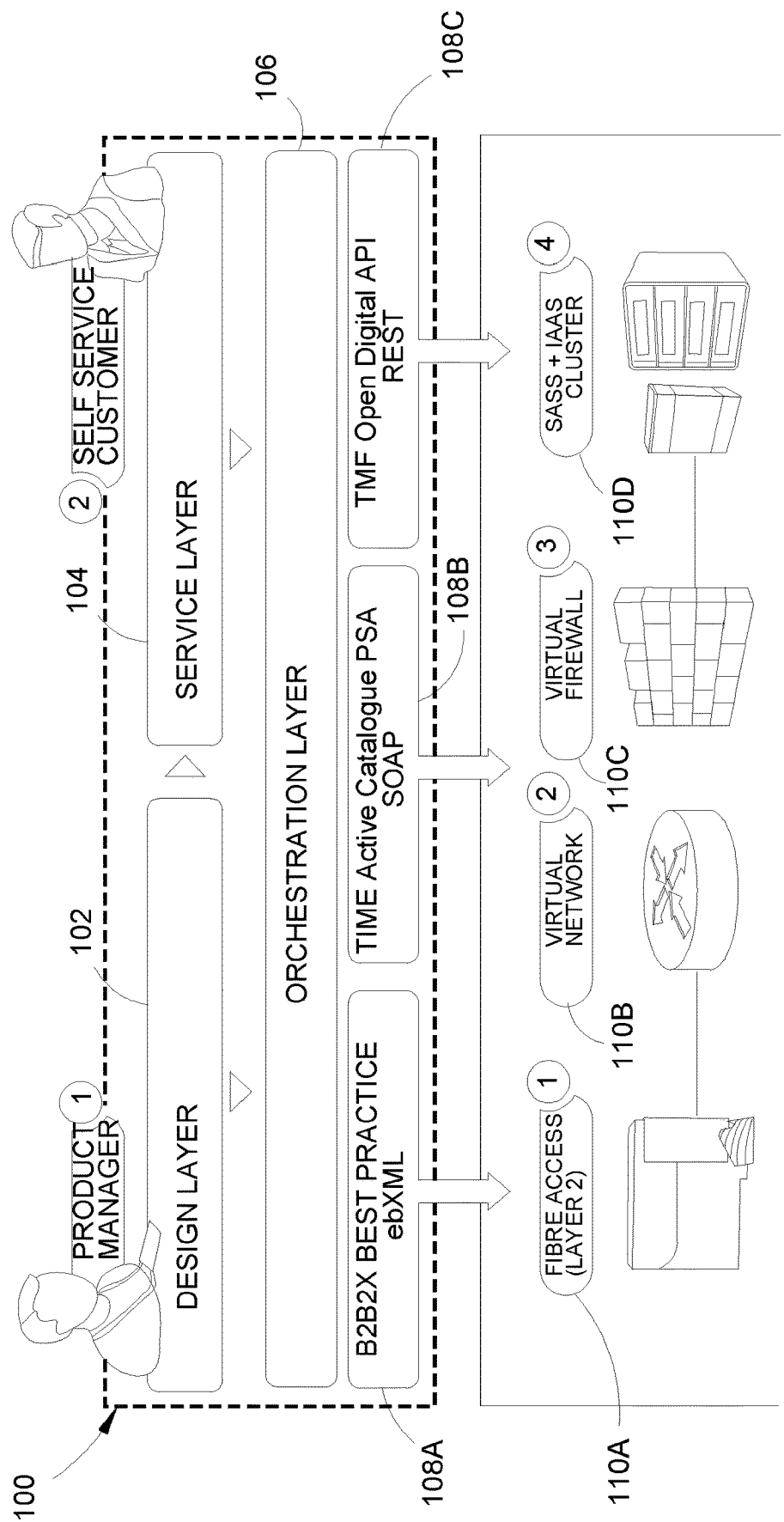
FIGS. 1A and 1B are schematic diagrams of a product defining and provisioning system for telecommunications products.

Herein is described a system and a process for defining and generating a telecommunications product offering, and ordering and provisioning the telecommunications product using the offering, in accordance with a predefined data schema. The system and process allow a telecommunications offering designer (a user who may be a product design engineer or product manager, e.g., a person working for a telecommunications company), to generate a schema-compliant machine-readable specification that defines an offering from the telecommunications company (e.g., a bundle of existing products and/or services) without having to manually write or edit machine-readable code (e.g., extensible markup language (XML) files). The system and process also allow the designer to generate a schema-compliant machine-readable ruleset for each specification, again without having to manually write or edit machine-readable code. The ruleset includes rules that define associations between properties of the specification that are automatically applied to simplify and verify data instances generated using the specification. The ruleset represents customisable logic that operates on properties of the specification based on input from the properties of the specification: the rules may generate outputs for the same properties from which they receive inputs, and/or for different properties. The specification and the ruleset are automatically applied by the system and process to generate schema-compliant machine-readable specification instances for orders based on input from submitters (e.g., users who are ordering one of the defined offerings, or users making orders on behalf of an end customer). The specification instances, when re-combined with their specifications, define and are used to provision the actual orders: an order specification includes one or more product specifications, which define respective separable portions of each order such that the portions can be divided automatically by a machine for provisioning separable products (which may be "services", e.g., network connections, or "resources", e.g., hardware devices, in telecommunications business terminology) in the order instance (e.g., one portion of the specification may relate to a new telecommunications connection, and another portion of the specification may relate to a new telecommunications device for attaching to the telecommunications connection).

The described process includes the steps of:

receiving, via a user interface, a request from a user for a specification for the telecommunications product;

receiving, via the user interface, characteristics data representing one or more characteristics for the specification from the user, including a plurality of properties for at least one of the characteristics;

receiving, via the user interface, input rules data representing at least one rule for the specification, including:

a selection of at least one of the received characteristics to provide a condition characteristic for the rule to operate, a selection of a rule type to define operation of the rule, and a selection of at least one of the received characteristics to provide a target characteristic on which the rule will operate; and processing the characteristics data and the input rules data, according to the predefined schema, to generate specification data representing the characteristics, and output rules data, representing the rules, such that the characteristics data and the output rules data are useable together to:

generate order interface data, representing an order interface for a customer to request the product, including one or more of the properties, and generate product component data representing product components of the requested product, based on the predefined schema, for provisioning the product.

Code libraries can be used by a portal to dynamically render screens and implement all the validation within a browser for the customer. The browser can use JavaScript code to retrieve the specification and the rules documents from a document data store, and can render the screen by interpreting the two documents together. A specification instance is captured once the fields are filled on the screen, conformant to the structure of the specification and the rules in the rules document. If there is data supplied prior to screen rendering, then the specification instance is pre-filled by the system. Validation, applying the rules, is performed in the browser (not the back end), improving the responsiveness and user experience.

Messages received by the system can be validated through the use of the same code libraries, specification and rules documents. The received message is interpreted against the relevant rules and specification documents, and rejected with reason if it fails to comply with either. Configuring the documents once, and being able to dynamically apply them to both Web and B2B (API) dynamically, allows for improved efficiency.

System 100

As shown in FIG. 1A, a product defining and provisioning system 100, in embodiments of the present invention, includes:

a design layer 102 (that operates during a "design time" of a defining and provisioning process 400) configured to receive input from the designer to define a telecommunications product offering, and to generate data representing one or more specifications ((including characteristics data and relationships data) and data representing one or more respective rulesets (including rules data), wherein the relevant specifications are identified in data representing an offering document that defines the product offering;

a service layer 104 (that operates during a "run time" of the process 400), in communication with the design layer 102, and configured to receive product order data from the customer, representing an order of the product offering (the generated data is referred to as an "order instance" or "order document" of the order specification, and it includes, or is associated with, at least generated one product instance of the product specification(s) defined in the offering document), via a user interface that uses the specification and the ruleset (including the characteristics data, rules data, and relationships data) that define the product offering to generate a user interface representation, user interface functionality, and validation of the user inputs;

an orchestration layer 106 (that also operates during the "run time"), in communication with the design layer 102 and the service layer 104, and configured to receive the specification and the ruleset (including the characteristics data, rules data, and relationships data) from the design layer 102, and the order data from the service layer 104, to validate orders and to generate product component data representing product components of the requested product, based on a predefined schema, for provisioning the product; and a plurality of connectors 108A, 108B, 108C (also referred to as "interface layers") that receive automatically selected portions of the instances according to the predefined schema, and generate data representing telecommunications components and configurations (including hardware network components 110A, virtual network components 110B, firewall components 110C, and/or cloud computing or storage 110D, etc.) that are required to provide (or "provision") the selected order to the customer.

Figure 1B:
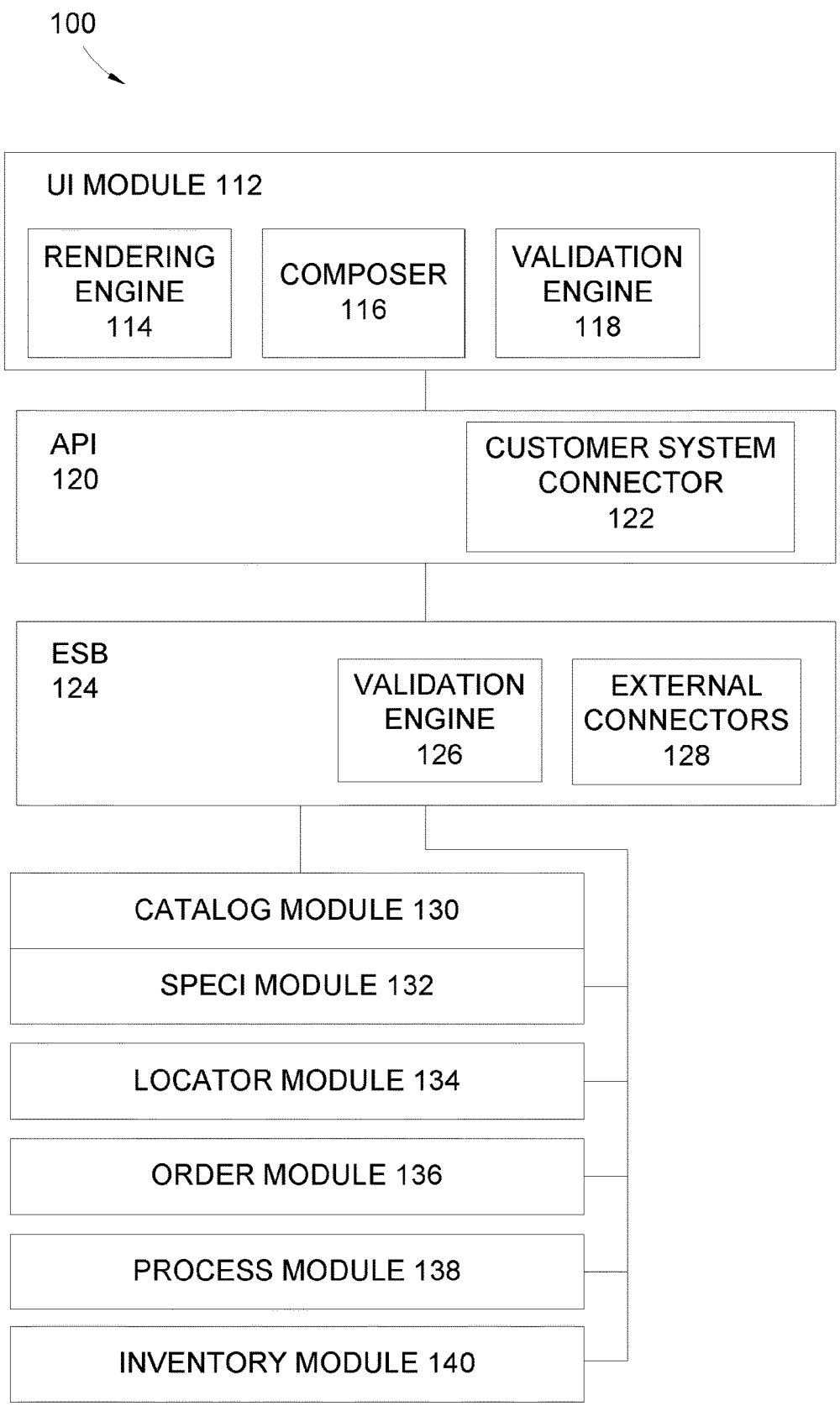

As shown in FIG. 1B, the system 100 includes a plurality of functional modules. The user-interface portions of the design layer 102 and the service layer 104, i.e., the portions that provide observable outputs to, and receive electronic inputs from, the designer and the submitter, are provided by a user-interface (UI) module 112 of the system 100. The UI module 112 includes a rendering engine 114 that accesses and uses the specifications and respective rulesets to generate the UI and validate user input: this active UI may be in a form, e.g., a Web form. The rendering engine 114 (or "renderer") includes a rules engine that processes the ruleset during the run time as the instance is entered to apply the rules continuously to the data inputs: this includes ensuring that input is compliant with the specification and the rules, indicating which input data is required, and automatically editing/creating portions of the instance as input data is received for other portions (based on the rules).

The UI module 112 includes a composer module 116 that accesses the user inputs to generate, edit, or compose the specifications and the rulesets. The UI module 112 includes a validation engine 118 that accesses generated instances, and uses respective specifications and rulesets to determine whether each instances complies with the corresponding specification and ruleset, and generates a resulting validation result (e.g., "complies", or "error" and an error location).

The system 100 includes an application programming interface (API) 120 that allows the UI module 112 to communicate (by sending and receiving messages, including XML and/or JSON messages) with the other components of the system 100. The API 120 includes at least one customer system connector 122 that provides external systems with access to the API 120: for example, an external customer system may have interface components that communicate with the system 100 without using all functions of the UI 112, e.g., to generate, to access and/or to edit the various system data documents (including the specifications, the rulesets, the offerings, the catalogs, the orders, the lifecycles, etc.).

The system 100 includes an enterprise service bus (ESB) 124 that passes the messages from and to the API 120, and communicatively connects the other modules of the system 100, in particular the back-end modules described hereinafter. The UI module 112 and the API 120 may be regarded as front-end modules that form a front end of the system 100, whereas the ESB 124 and other modules form a back end of the system 100. The ESB 124 includes a validation engine 126 that validates the instances (in the same way as the validation engine 118 in the UI module 112: in this way the engine 126 can be a copy of the engine 118), and that validates all data messages into and out of the back end. The messages passing through the ESB 124 are validated by the ESB 124 using the data schema, thus validating that the data documents in the messages are schema-compliant. The data schema can be stored as data, referred to as a common information model (COM), in a COM component in the ESB 124.

The ESB 124 includes one or more external connectors 128 that allow for data communications with external systems (outside the system 100) that are still validated for schema compliancy by the ESB 124.

The system 100 includes a plurality of the back-end modules, each communicatively connected by the ESB 124, including:

a catalog module 130 for managing catalog data representing catalogs of pluralities of offerings;

a specification manager 132, also known as a specification module, that supports creation of specifications, access to specifications, rendering of specifications, lifecycle management of specifications (in accordance with the associated lifecycle), data integrity validation of specifications, and storing of the specification data separately from the corresponding rules data, e.g., in separate data structures or files, so they can be accessed and used separately;

a locator module 134 for managing site-specific data representing customer sites;

a customer order manager (COM) 136, also known as an order module, that manages creation and modification of orders;

a process module 138 that receives and stores customer-specific delivery process documents, each including a delivery process definition (e.g., based on processes of the telecommunication provider, including details of installers) and a machine-readable identifier (ID) to associate the delivery process document with orders and instances; and an inventory manager (IVM) 140, also known as an inventory module, that manages inventory data. The components of the system 100 (including the modules 112 to 140, the design layer 102, the service layer 104, and the orchestration layer 106) are provided by at least one computer server 202 that communicates with a plurality of computing clients 204A, 204B, 204C over at least one data network 206, as shown in FIG. 2. The components of the system 100 are stored as non-transitory computer-readable instructions in storage of the server 202, and served to the clients 204A, 204B, 204C, which may include providing data for a world-wide web browser of the clients 204A, 204B, 204C so that the user or the submitter can use the browser to access the front end (including the design layer 102 or the service layer 104), in particular the UI module 112. The UI module 112 includes portions that are served to the clients 204, including the rendering engine 114, composer 116 and validation engine 118, and portions that remain on the server 202 and communicate with the clients 204. The portions of the UI module 112 for the design layer 102 and the service layer 104 are served by the server 102 as instructions that are executed by clients 204 (including the browsers) to generate the user interfaces, and receive the data inputs (which may include data definition libraries and Java code being loaded into the browsers), so that only the documents, including the specifications (represented by the specification data including the characteristics data), the rulesets (represented by the rules data), the offerings and the orders and the catalogs, and the lifecycles (represented by lifecycle data), need be transmitted over the network 206 between each client 204A, 204B, 204C and the server 202.

The design layer 102 of the UI module 112 includes the composer component 116 that provides the user interface for the user to generate the system documents (including the specification data, the rules data, and the relationships data, etc.). The design layer 102 includes the rendering engine 114 (also referred to as a renderer component or a rendering component) that is used by the designer to view a rendering of the order-entry interface after the specification and the ruleset (including the specification data, the rules data, and the relationships data) have been generated by the composer component 116. The renderer component 114 may be downloaded from the server 202 to the client 204, and operate to process the entered data to render the order interface without sending or receiving data from the server 202, thus shifting the processing associated with rendering the order interface from the server 202 to the clients 204 (which may reduce network usage and server load, and may increase responsiveness for the designer user). The renderer component 114 and the composer component 116 are referred to as tools, or engines, for processing the user input data and the system document, including the specifications, the rules, the instances, etc. (represented by the specification data, the rules data, and the relationships data, etc.). In an example, the engines may be implemented using Java and/or Java Script.

The service layer 104 of the UI module 112 accesses the renderer component 114 to render customer interfaces on the clients 204 to receive user-input data representing the orders (to generate the order instances and product instances) from the submitter. The service layer 104 accesses the back-end components in the product system 100 using the ESB 124 that provides a data gateway to the other back-end components.

The service layer 104 includes the validation engine 118 of the UI module 112 that validates each specification instance against the ruleset (i.e., the rules data), and validates in turn each related specification in the relationships data, when an order is being made.

Figure 3A:
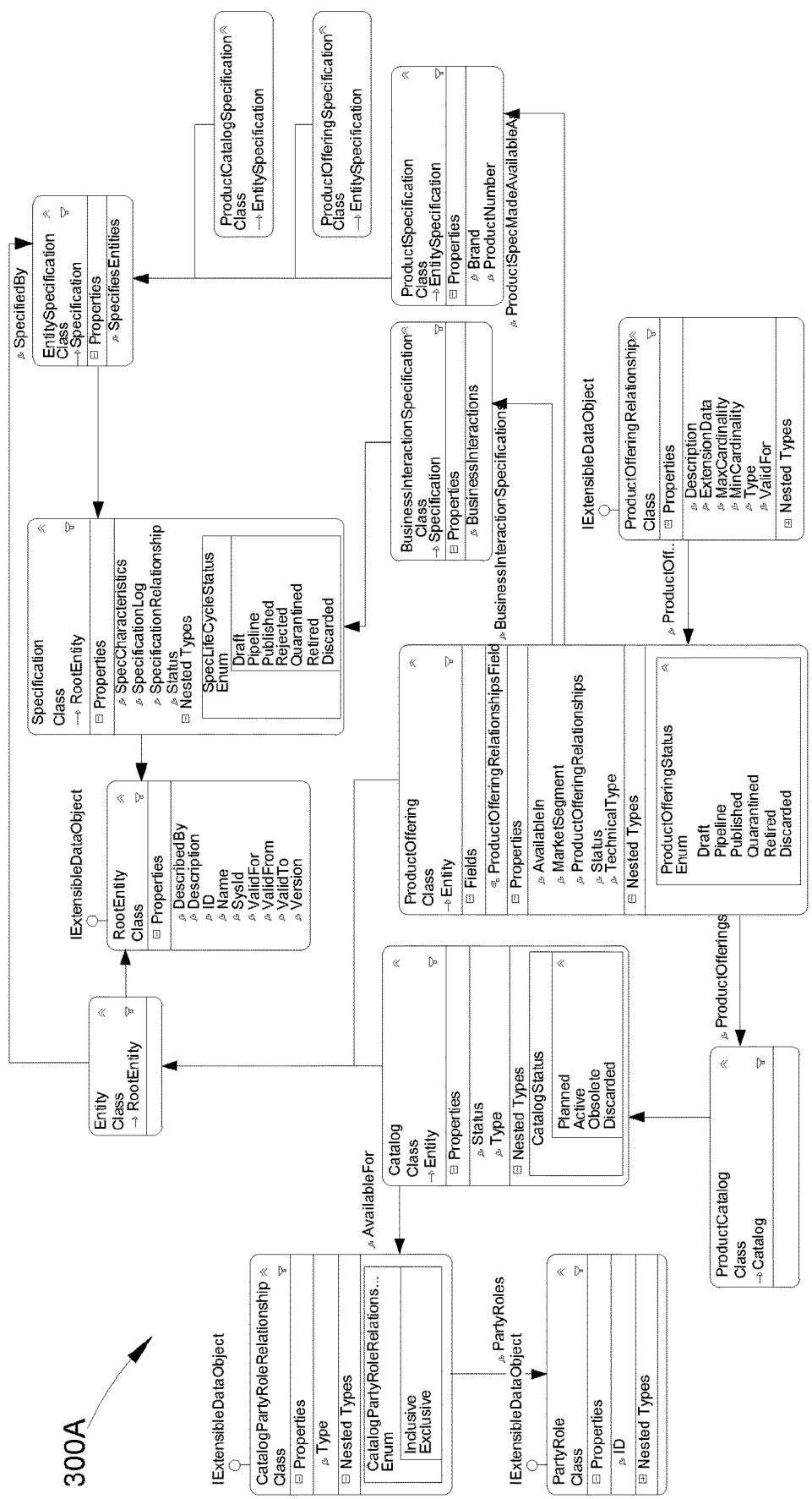
FIG. 3A is a data model diagram for a data schema of the system.

The specification documents (represented by specification data and the relationships data), the rulesets (represented by the rule data), the offerings, the catalogs and the orders (represented by the specification data), and the lifecycles (represented by the lifecycle data) are received as messages by the ESB 124 from the back end or from the front end or from the external systems. As described hereinbefore, the ESB 124 validates the messages using the schema. The schema is represented by schema definition data that in turn represents a data model 300A, as shown in FIG. 3A, in which each product offering class can include a selectable plurality of characteristics (referred to as "SpecCharacteristics") and relationships (referred to as "SpecificationRelationships") for each specification (referred to as a "Specification"). The schema definition data may be formatted as an XML Schema Definition (XSD) file.

Figure 3B:
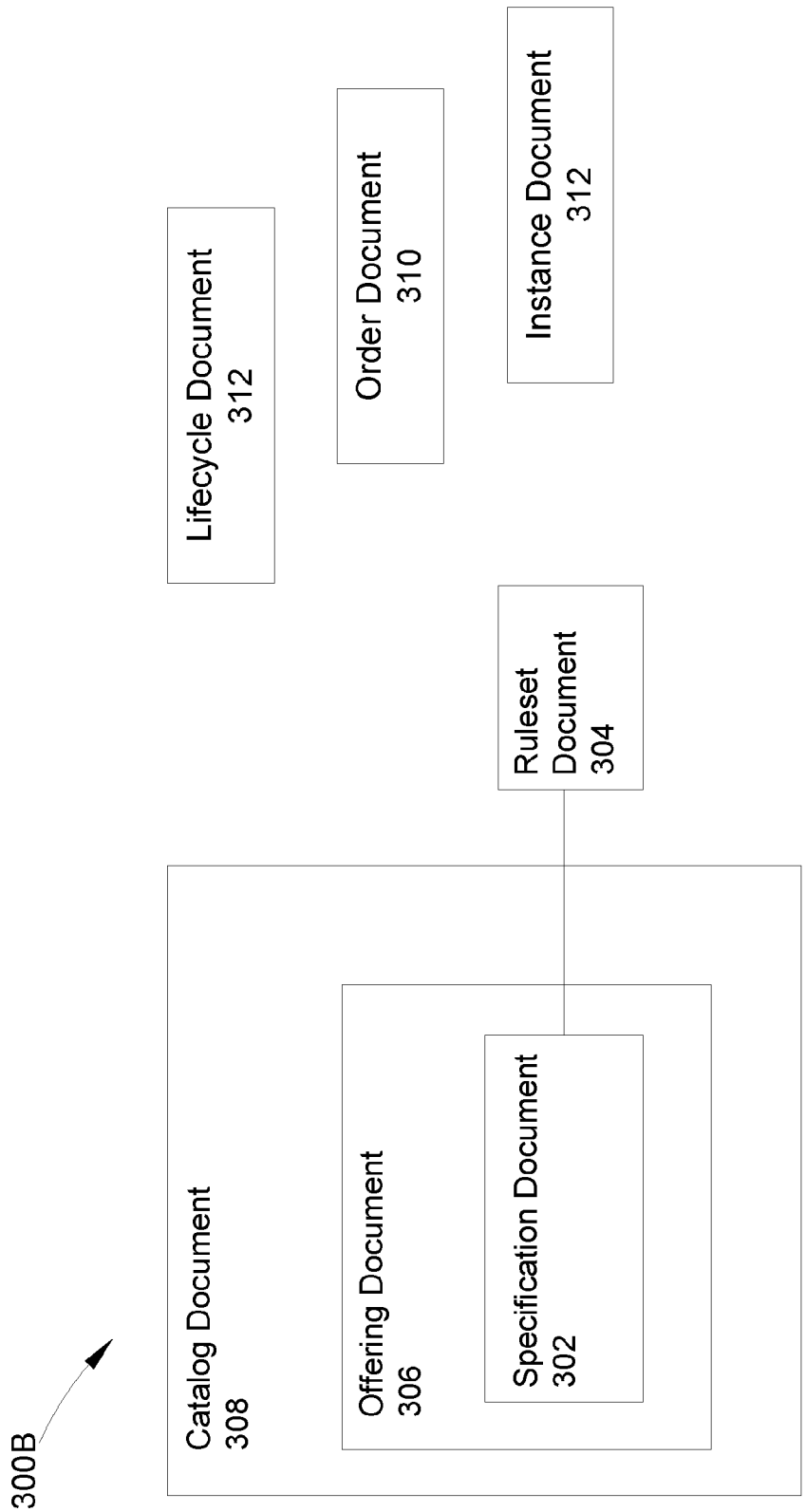
FIG. 3B is a block diagram of data structures in the system.

As shown in FIG. 3B, the system 100 stores and communicates the system data in data structures that are defined by, and conform to, the schema, including a specification document 302 for each specification, a ruleset document 304 for each ruleset (that is linked to the corresponding specification document 302 by an association including a specification ID or ruleset ID), an offering document 306 for each offering (including a plurality of specification IDs that identify respective specifications in the offering), a catalog document 308 for each catalog (including a plurality of offering IDs that identify respective offerings in the catalog), a lifecycle document 312 for each lifecycle (including a lifecycle ID that is used in corresponding specifications), an order document 310 for each order, and an instance document 312 for each instance (including an instance ID to identify the instance). The lifecycle document (e.g., an XML document) includes data representing a series of states that can be applied to an instance, and the stated represent stages of the instance that occur during the process 400, including a draft state, a submitted state, an acknowledged state, a rejected state, a complete state): the lifecycle is defined by a designer to accord with management process of a telecommunications provider, and can then be associated to a plurality of specifications, including orders, so that the rendering engine 114 can display the current state of an order or an instance using the current lifecycle state, can display past and future states, and can accept user input to progress to the next state defined in the associated lifecycle. Thus lifecycle management is associated with each order based on common lifecycles defined for a plurality of orders. The order document 310 is a specification for available orders, and includes order-specific characteristics, including order-termination conditions set by the designer. The order instance is associated with a plurality of product instances in the order that are generated based on input from by the submitter using the service layer 104.

The specifications may be referred to as "dynamic-data specifications", and represent highly flexible documents for describing all data requiring dynamic typing and definition (including in relation to the product offerings, the customer orders, the services and resources in the specifications, etc.). The dynamic-data specifications facilitate rapid tooling/customisation while decoupling specification releases from operational releases to improve product time-to-market and reduce operational costs for provisioning telecommunications products. The dynamic-data specifications are structured, conform to industry standards, and are machine readable (and may be XML documents). The specifications are maintained by the specification manager 132 that supports specification creation, access/rendering, life cycle management, data integrity validation. The dynamic specifications may enable the adaptation and accommodation of these ongoing changes with minimal operational expenditure, and conversion into alternative formats to support external system integration. The specification may be referred to as a grouping construct which provides structure to the dynamic data patterns (Characteristic Specification/Characteristic Value) available within a standard format, e.g., the TMForum's Information Model (SID), set by the predefined schema. As described herein, the specification is used for applying structure to stored dynamic data (the instances), where a specification of a given type and version is used when writing the dynamic data, and the same specification type and version needs to be used to interpret the dynamic data when reading. The specification may also be used for providing a "contract" for dynamic data exchanges been systems, including between organisations, e.g., when sending order messages to the external systems. A message (the instance) is formed to be compliant to the specification and can then be interpreted or read using the specification as a template. The specification is used for rendering the user interfaces by the renderer component 114: the specification contains the base information required to render a user interface, and the data collected from the user interface forms the "specification instance". This specification instance can then be used within messages for exchange with other systems, which also utilised the same type and version of the specification. A Specification Instance is the data captured when using the specification as a template: for example a product specification provides a template for a telecommunications product (which may be associated with a "service" or a "resource") represented by a product specification instance associated with an order instance. The specifications are used to render screens, store captured data in inventory, and create and validate messages exchanged with external systems.

Each specification (represented by the specification data) is generated (in the process 400) to include one or more characteristics (represented by characteristic data in the specification data), and each characteristic is generated to have one or more selected properties that define how the characteristic is used: when a specification is rendered by the render 114, the characteristics of that specification define fillable data fields to accept use input data, and the properties of the characteristic define what data values are acceptable in the data fields, including data types. The available properties and characteristics are defined by the schema. The characteristics and properties of each specification are selected by the designer (using the design layer 102), and the data is entered into the data fields of the specification by the submitter (using the service layer 104), limited by the properties of each characteristic (and assisted by the ruleset), to generate an instance.

The relationships specify other specifications to which the current selected specification relates, and can associate different product specifications that relate to different provisioning entities into one order specification. In an example, a relationship is defined, by the designer, to associate two product specifications, where one specification is used to receive data from a submitter (to define a product and order) while the other specification is not made available to the submitter, and thus is not exposed to one of the clients 204 after the design time, but is includes data that is used during completion and provisioning of the order (e.g., data representing information used by the external provisioning systems, but not of relevance to the submitter—for example, this could be information on telecommunication suppliers who provision the actual telecommunications "services" and "resources" defined in the product instance).

The characteristics may have one of the following selected types, defined in the schema: Enumeration Type, Key Value Type, Range Type, and Collection Type.

The Enumeration Type provides a list of values to select from of a given type (e.g., String, Integer, Float, etc.) from which a single value may be selected. The enumerated list may have optional properties applied including being made read only, having a default value, or corresponding to a unit of measure for each value.

The Key Value Type includes Name and Value that conforms to given data type (e.g., String, Integer, Float, Date-Time, etc.). The Key Value may have optional properties applied including being made read only, having a default value, or corresponding to a unit of measure for each value.

The Range Type is a Key Value that accepts a single numeric value within a constrained range. The Key Value may have optional properties applied including being made read only, having a default value, or corresponding to units of measure for each value.

A characteristic of the Collection Type is a characteristic that enables other characteristics to be created as children and be grouped. For example, a Collection of User Details could be created with children characteristics of First Name, Last Name and Phone Number. The grouping formed with collections is used for a range of purposes including for presentation and to support rules, allowing a rule to be applied to a parent and apply to each of the child characteristics.

The characteristics may have one or more of the following properties.

The Characteristic Property (also referred to as a characteristic option) controls the isolated behaviour of the characteristic.

The Cardinality Property controls the number of instances of the characteristic within the specification instance. The minimum cardinality value is the minimum number of characteristic instances required. For example, if the minimum cardinality is one then one instance must be provided in order for the specification instance to be compliant to the specification. Or another way of considering it is that in a field that providing a value is mandatory. A specification instance can have characteristic instances up to the maximum number specified in the cardinality instance property. This is useful in dealing with multiplicity relationships like number of logical or physical ports on a piece of network equipment for example.

The Default Value Property is the default value of the characteristic that can be set automatically within the specification instance. The value of the characteristic is still able to be overwritten by the user.

The Unit of Measure (UOM) Property is a user defined String that can be applied to provide further information on a characteristic and can be any character. For example a Unit of Measure can be applied to a price characteristic as "USD".

The Read Only Property allows the characteristic to be defined and visible, but not editable by the user. For example, the price of a product may be displayed, but not editable by the user.

The Encryption Property defines a public key, which is part of a public-key cryptography system, received from the designer using the UI module 112 during the design time. The Encryption Property is added to a characteristic that receives potentially confidential information, e.g., passwords. The public key of the Encryption Property is then used by the UI module 112, based on user input from the submitter during run time, to encrypt data entered into the corresponding characteristic (e.g., password text) in the client 204 of the submitter so that the data for this characteristic, stored in the generated instance, remains encrypted while in the system 100. The private key, corresponding to the public key, is used in an external system to decrypt the encrypted data once the encrypted data has left the system 100. In this way, certain data fields (characteristics) can be used to carry confidential data through the system 100.

The rules, in the rules data, are applied to each product specification, and to each product offering, and to each order specification.

The rules in the ruleset are used to manage the interactions between the characteristics of a specification. For example, a rule can be created to: (i) modify a characteristic once preset conditions are satisfied—e.g. automatically set the price, once a given product is selected in an Enumeration; (ii) add or remove a characteristic if preset conditions are satisfied—e.g. add additional values for the contact details of the building owner in a multi-dwelling unit; (iii) make a characteristic read-only if preset conditions are satisfied; or (iv) hide a characteristic from the user if preset conditions are satisfied. The rules may be used to implement company specific business rules, apply constraints, reduce errors and improve the user experience in creating the specification instance. The format for rule representation between trading partners may be of a lower relevance than the format of specifications and their characteristics and properties.

The rules extend specifications through a common set of definitions with which to describe inter characteristic behaviours. This means that much of the logic that may have previously been coded into Portals, Integration Layers, and Backend Components can, in the system 100, be described in commonly useable rules data for each specification. The rules are applied as an addition to the specification, and may not override or invalidate the specification itself. Conditions may be specified for a rule to operate on order data entered into the characteristics of a specification; otherwise a rule will always be applied. Both specifications and offerings may have separate and independent sets of rules. Specification-level external rules are limited in scope to elements only within the specification itself. These rules are always applicable regardless of whether the specification is alone or is part of an offering. Offering-level external rules are only relevant within the offering itself their effects on affected specifications do not apply when the same specification is in another offering. The rules defined on this level should only be extra-specification rules (relating elements across different specifications), or intra-specification rules that are conditional upon being a part of the offering.

The following rule types are captured in the external rules document complementing the product definition documents, and are defined in the schema: value availability; availability; value; comment; read only; cardinality constraint; cardinality lock; and action availability.

The Value Availability rule specifies which values of the target characteristic are to be available. The remaining values are unavailable, unless declared available by alternative rules. Where multiple Conditional Value Availability rules are applicable, a value will be available as long as the condition for at least one relevant rule is satisfied. This rule accepts multiple values for the same target. A valid target is SpecCharacteristic. Examples include: Location value set to "Outdoor" available if "NTD Type" is "External"; and Speed plan/sub-plan selected may both influence the "Interface Speeds" available. (In an example, Speed may be 2-1000 Mbps if plan Fibre and sub-plan ABC is selected.)

The Availability rule specifies the availability of a target characteristic or specification. If the target is unavailable, it may not be ordered for the entity instance. This rule primarily differs from the Read Only rule in that the affected characteristic or specification will be excluded from the subsequent entity, whereas the latter rule will retain its last assigned value. Use this rule with caution, as it is possible for this rule to violate specification's definition of mandatory elements. Valid target are SpecCharacteristic, and Specification. Examples include: Ask for an "Authorisation Code" when user selects "MTU" greater than "MTU Generic Max"; and "Building Owner Name" and "Building Owner Contact Number" are only available when "End User Location"="MUC".

The Value rule specifies that the value of the target characteristic is set to the rule's target value. Changing the value after this rule is applied is possible if the characteristic is not read only. A valid target is SpecCharacteristic. An example is: Default value of "Transparent VLAN" dependent on whether or not selected access link allows multiplexing.

The Comment rule specifies that the specified comment is specified to be relevant to the target characteristic. This rule is mainly of value when the specification is rendered visually. Valid targets are SpecCharacteristic and Specification. An example: If "PSTN Phone Number" is not specified when ordering ADSL, show a note specifying that the customer should inform service provider as soon as possible when one is obtained.

The Read Only rule specifies that the target characteristic may no longer have its value changed manually. It will retain its last assigned value, and may still have its value changed via subsequent Value rules. If the target is a specification, this rule will be applied to all of its characteristics. Valid targets are SpecCharacteristic and Specification.

The Cardinality Constraint rule constrains the cardinality range of the target to a subset of the range specified in the specification. If the target previously had a minimum cardinality of 0, raising it to at least 1 will make the target mandatory. Valid targets are: SpecCharacteristic and Specification. In an example, "Building Owner Name" is mandatory if end user location is a multi-dwelling unit.

For the Cardinality Lock rule, valid targets are SpecCharacteristic and Specification.

For the Action Availability rule, a valid target is Specification.

The system 100 provides definition and application of business and technical rules, granting designers an additional layer of control over how their specifications are consumed and processed. This approach may dramatically reduce the degree of tooling required to introduce new products, while also ensuring that validation and business rules are applied in a consistent manner across all components.

Process 400

In operation, the system 100 performs or executes the process 400, which includes:
- a design process (executed by the design layer 102 in "design time") to design available lifecycles, specifications, offerings and catalogs;
- an ordering process (executed by the service layer 104 in "run time") to generate one or more product instances and at least one order instance;
- a provisioning process to provision the telecommunications products based on the order and the lifecycles.

In the design process, the design layer 102 executes a computer-implemented process for defining a telecommunications product in accordance with a predefined schema, the process including the steps of:
- receiving, via a user interface, a request from the designer (a user, e.g., a telecommunications product engineer) for a specification (a product definition) for the telecommunications product;
- receiving, via the user interface, characteristics data representing one or more characteristics for the specification from the user, including a plurality of properties for at least one of the characteristics;
- receiving, via the user interface, input rules data representing at least one rule for the specification, including:
  - a selection of at least one of the received characteristics to provide a condition characteristic (an input) for the rule to operate,
  - a selection of a rule type to define operation of the rule, and
  - a selection of at least one of the received characteristics to provide a target characteristic on which the rule will operate; and
- processing the characteristics data and the input rules data, according to the predefined schema, to generate specification data (e.g., in the extensible markup language, XML) representing the characteristics, and output rules data, representing the rules in a ruleset, such that the characteristics data and the output rules data are useable together to:
  generate order interface data, representing an order interface for a submitter to request the product, including one or more of the properties, and
  generate product component data representing product components of the requested product, based on the predefined schema, for provisioning the product.

The design process includes receiving a render request from the designer to render an order interface. The render request is generated by clicking on a render button in the design interface.

The design process includes receiving a rule with a rule name, rule description and rule type, and displaying the rule in the rules tab.

The design process includes receiving characteristic name, a characteristic type, a cardinality, and a description, and displaying the characteristic name.

The ordering process includes the renderer component using the specification data to render an order interface, optionally with selectable properties, showing the defined product, and allowing a submitter to enter data to order the new product.

The ordering process includes receiving from the user a specification name, a specification type, a specification class, and a specification delivery process;

The design process includes receiving a selection of at least one relationship for one of the characteristics, where the relationship specifies a different previously defined product specification, and displaying the relationship (in a relationships tab), and generating relationships data defining the relationships to form an offering.

The design process includes optionally receiving field names and definitions (e.g., values in an enumerated list), depending on the characteristic type, and displaying these fields (in the specification tab).

The ordering process includes validating data representing the instance against the specification data and the rules document.

The provisioning process includes processing (including decomposing, or "breaking down") the specification, ruleset and instance, including the relationships in the order, to generate decomposed order data (in computer-readable files) for external systems of telecommunications service providers according to known standards, such as the TM Forum 'Frameworx' standards. The relationships define what other different sub-specifications need to be decomposed for the overall product to be provided, e.g., decomposed into "services" and "resources" by telecommunications suppliers.

The design process may make it easier for a telecommunications provider to define new products, and generate order forms and instantiate the order data according to the specifications and rules, for customers.

The provisioning process includes the step of
generating the product component data representing the product components.

Also provided is non-transitory storage with computer-readable instructions configured to implement the processes above.

Figure 4A:
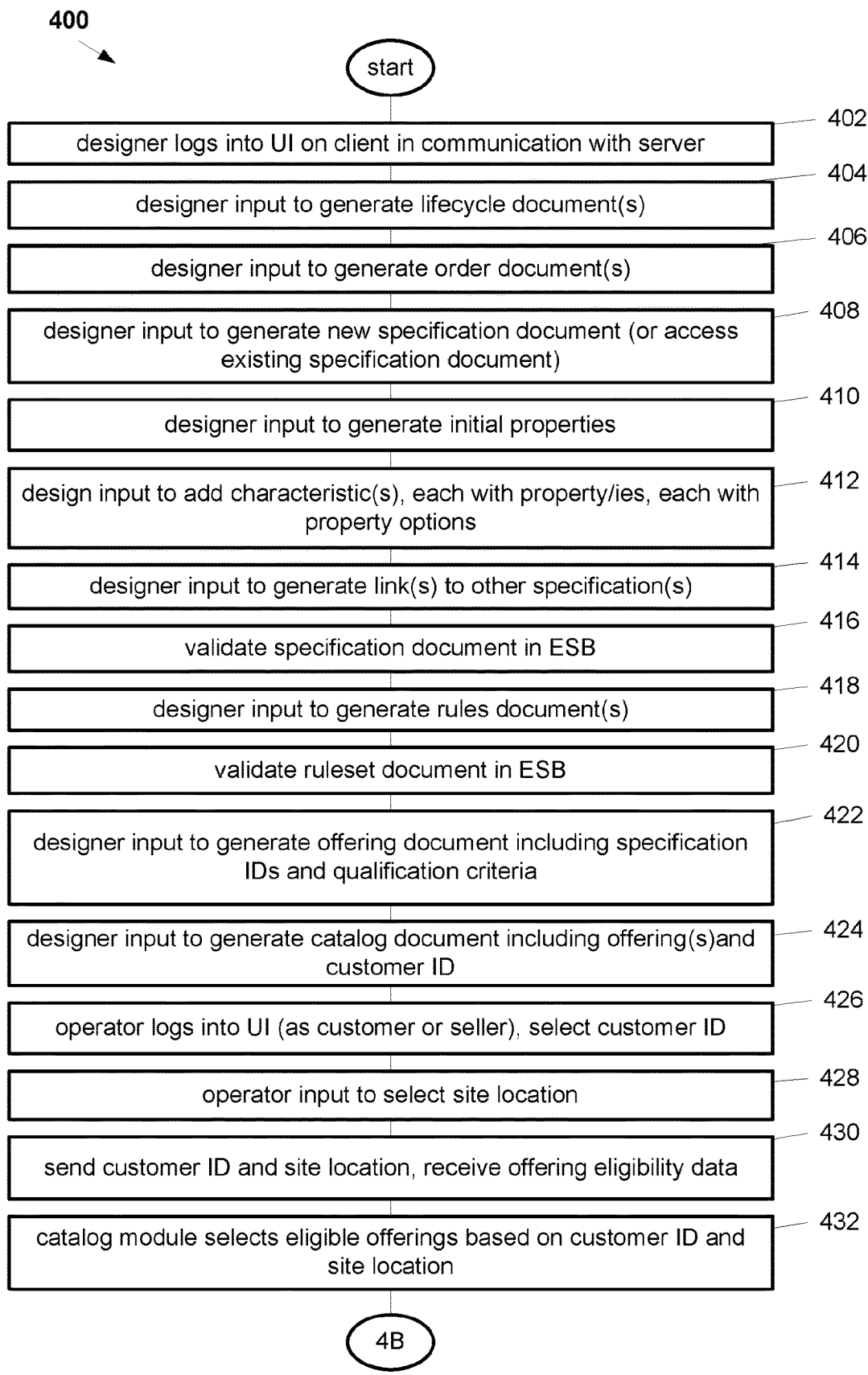
FIGS. 4A and 4B is a flow chart showing steps in a defining and provisioning process performed by the system.
Figure 4B:
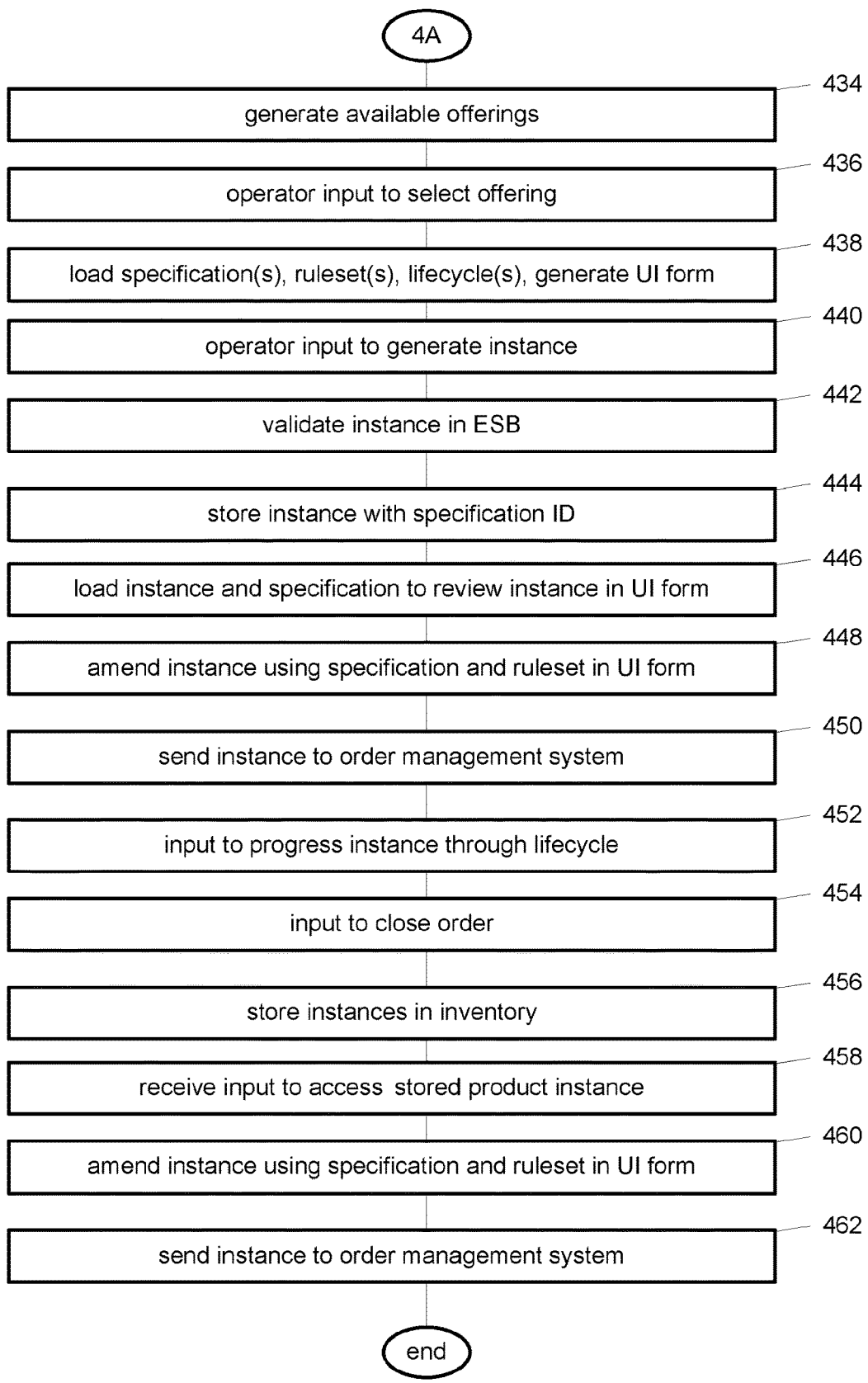

As shown in FIGS. 4A and 4B, the process 400 includes at least the following steps:
  the UI module 112 receiving login data from the client 204 for the designer to log into the UI module 112, and loading a portion of the UI module 112 onto the client 204 from the server 202 (step 402);
  the UI module 112 receiving user input data to define and generate a lifecycle document (step 404);
  the UI module 112 generating an order-input interface, and receiving user input data to generate an order specification document (step 406);
  the UI module 112 receiving user input to generate a specification, or to load an existing specification, and loading a specification from the specification manager 132 to the client 204 (step 408);
  the UI module 112 receiving user input to generate initial properties for the specification (step 410), including a human-readable name and description, a machine-readable association (or "link") with a lifecycle document, a machine-readable schema class for the specification (in accordance with the schema) that defines a technical category of the specification in the schema, and a machine-readable association with a delivery process document stored in the process module 138;
  the UI module 112 receiving user input to generate one or more characteristics that are added to the specification document, each characteristic including properties (step 412), where the available characteristics and properties are defined in the schema as described hereinbefore, including a human-readable name, machine-readable characteristic types (described hereinbefore), machine-readable data type definitions for values (e.g., text, Boolean, integer, etc.)—the composer module 116 generates the specification (e.g., as an XML document) continuously as the user input is received;
  the UI module 112 receiving user input to generate relationships that define links to other specifications, and thus define a plurality of associated product specifications of an order specification (step 414);
  the UI module 112 sending the generated specification to the back end where it is validated by the ESB 124 according to the schema (step 416);
  the UI module 112 receiving user input to generate the ruleset, including receiving properties for each rule (step 418), selected based on the available rule types in the schema (described hereinbefore), and the ESB 124 accessing data from external systems using the external connectors 128 to access machine-readable properties for rules defined by external systems (e.g., specific for specific designers)—the ruleset is generated as a ruleset document (e.g., XML) as the rules are defined, and each ruleset has a defined one-to-one association with a previously generated specification by including a specification ID;
  the ESB 124 validating the generated ruleset based on the schema (step 420);
  the UI module 112 receiving user input to generate an offering (i.e., an offering document, e.g., in XML) that defines an association with one or more previously generated specifications, and defines one or more machine-readable qualification criteria (step 422);
  the UI module 112 receiving user input to generate a catalog (i.e., a catalog document, e.g., in XML) including associations with one or more of the previously defined offerings, and an association with a customer (e.g., a customer ID) defined in a customer database, e.g., a customer relationship management (CRM) database, which can be an external system accessed using the external connectors 128; and storing the catalog by the catalog module 130 (step 424);
  the UI module 112 receiving user input for the submitter (i.e., a person representing a customer) to log into the UI module 112, and receiving a selection of a customer, e.g., a customer ID, for the system 100 to determine which lifecycles, etc., are available to this customer based on the customer ID (step 426);

the UI module 112 receiving user input to select a site location (e.g., a site ID) associated with the customer ID (step 428);

the UI module 112 sending data representing the customer and the site location (e.g., customer ID and site ID) to an external system, e.g., through the external connectors 128, to determine which offerings are available for this customer at this site by automatically accessing data records based on the data representing the customer and the site location, and the system 100 receiving in return data representing offering eligibility (step 430);

the catalog module 130 receiving data representing the offering eligibility, through the ESB 124, determining stored catalogs with qualification criteria that match the offering eligibility (thus the catalog module 130 selects eligible offers based on data identifying the customer and the site), and sending these catalogs to the UI module 112 (step 432);

the UI module 112 generating a UI display, for the submitter, indicating the available catalog(s), and thus available offerings and specifications (step 434);

the UI module 112 receiving user input from the submitter to select one of the available offerings (step 436);

the UI module 112 loading the specifications, rules and lifecycle documents for the selected offering to the client 204, and the rendering engine 114 generating an active form for the submitted to view and enter data (step 438);

the UI module 112 receiving user input to add data to the data fields of the characteristics of the loaded specification, and contemporaneously applying the rules in the loaded ruleset to control which use input is accepted by the UI module 112, and to automatically determine data for others of the data fields, using the rules engine, thus generating an instance of the order specification and one or more instances of loaded product specifications (step 440)—the data for each characteristic can be manually entered by the submitter, or automatically determined from the manually entered data and the rules (by the rules engine)—the UI module 112 receives user input to select the lifecycle state, which include selecting of the states in the lifecycle associated with each specification;

the UI module 112 sending the order and product instances to the ESB 124, which validates them, including using the validation engine for the instances (step 442)—as the instance data is data received from a client 204, which may corrupted or non-compliant, the ESB 124 also re-validates the order specification, the product specification(s) and respective ruleset(s) as they are returned with the instances;

the back end modules store the instances as instance data associated with the specifications (e.g., as values with respective characteristic IDs), thus multiple instances associated with a specification can be stored relatively efficiently since only the data values are stored, not the data types, but the data types can still be determined for later validation, editing, etc. (step 444);

the UI module 112 receiving user input data to load an existing instance into the UI module 112 for display, which includes loading the associated specification, but not the rules because stored instances have been validated (step 446);

the UI module 112 receiving user input to edit an instance, which includes loading the instance, the associated specification and the associated rules into the UI module 112, displaying the instance, and operating the rules engine to validate data entry (step 448);

the UI module 112 sending an instance to an order management system, which can be the COM 136 or an external system connected to the external connectors 128 (step 450);

the UI module 112 receiving user input to load up the instance, and to progress to the next lifecycle state, which can include approving an order, or submitting an order, or invoicing an order, etc. (step 452);

the UI module 112 receiving user input to complete or close an order (step 454), which is the step that effects provisioning, and the process module 138 separates different portions of the instance document that correspond to different portions (e.g., different departments in a the telecommunications organisation that provide different parts of an telecommunications product) based on identifiers in the instance that were defined in the specification;

the system 100 storing completed instances in the IVM 140 (step 456);

the UI module 112 receiving user input to access a stored product instance (step 458);

the UI module 112 receiving user input to edit the accessed stored instance, again using the specification and the ruleset (step 460); and the UI module 112 again returning the edited instance to the COM 136 (step 462).

The steps 402 to 424 form the design-time portion of the process 400. The steps 426 to 460 form the run-time portion of the process 400.

Figure 5:
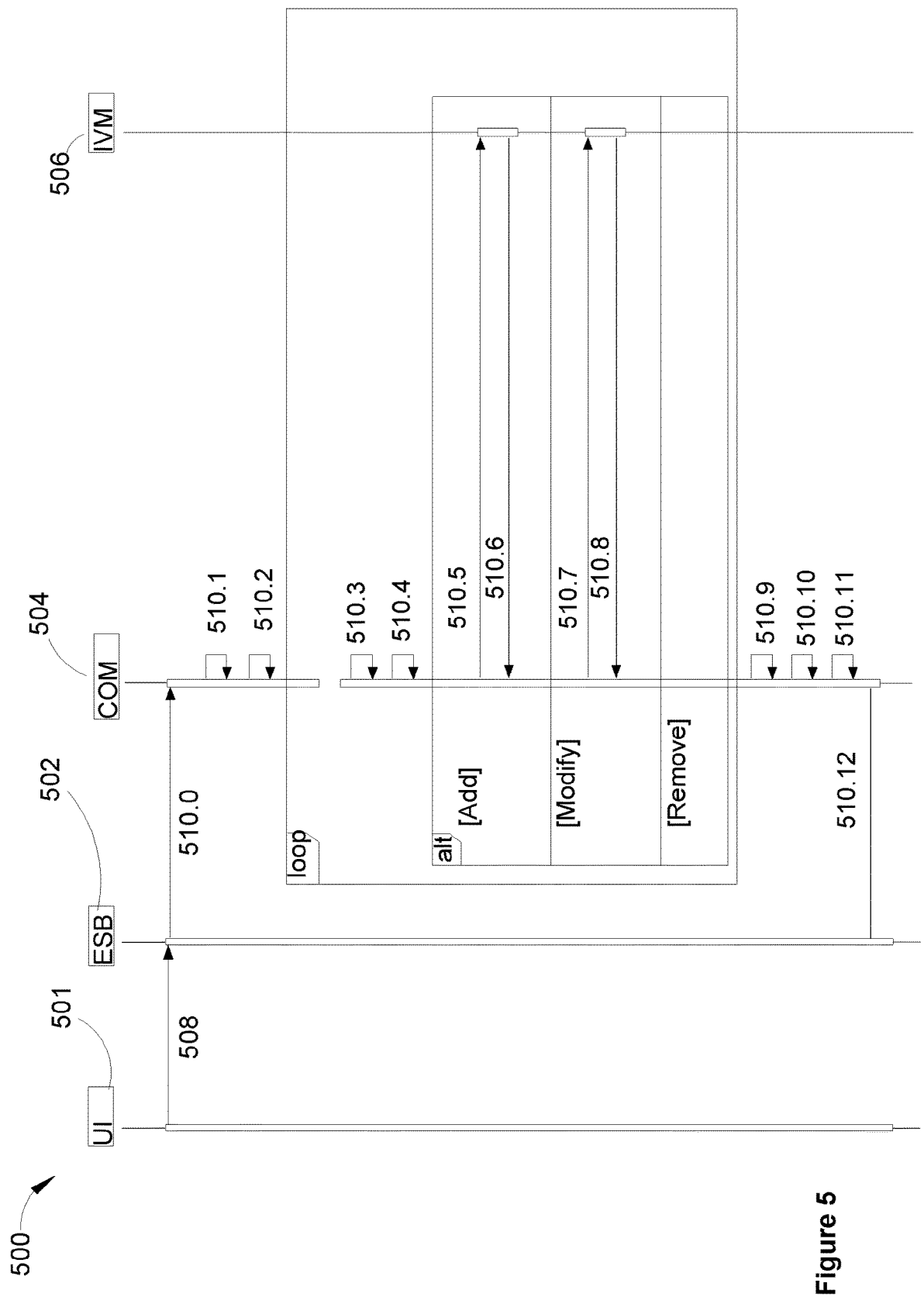
FIG. 5 is a sequence diagram of a create-customer-order process performed by the system.
Figure 6A:
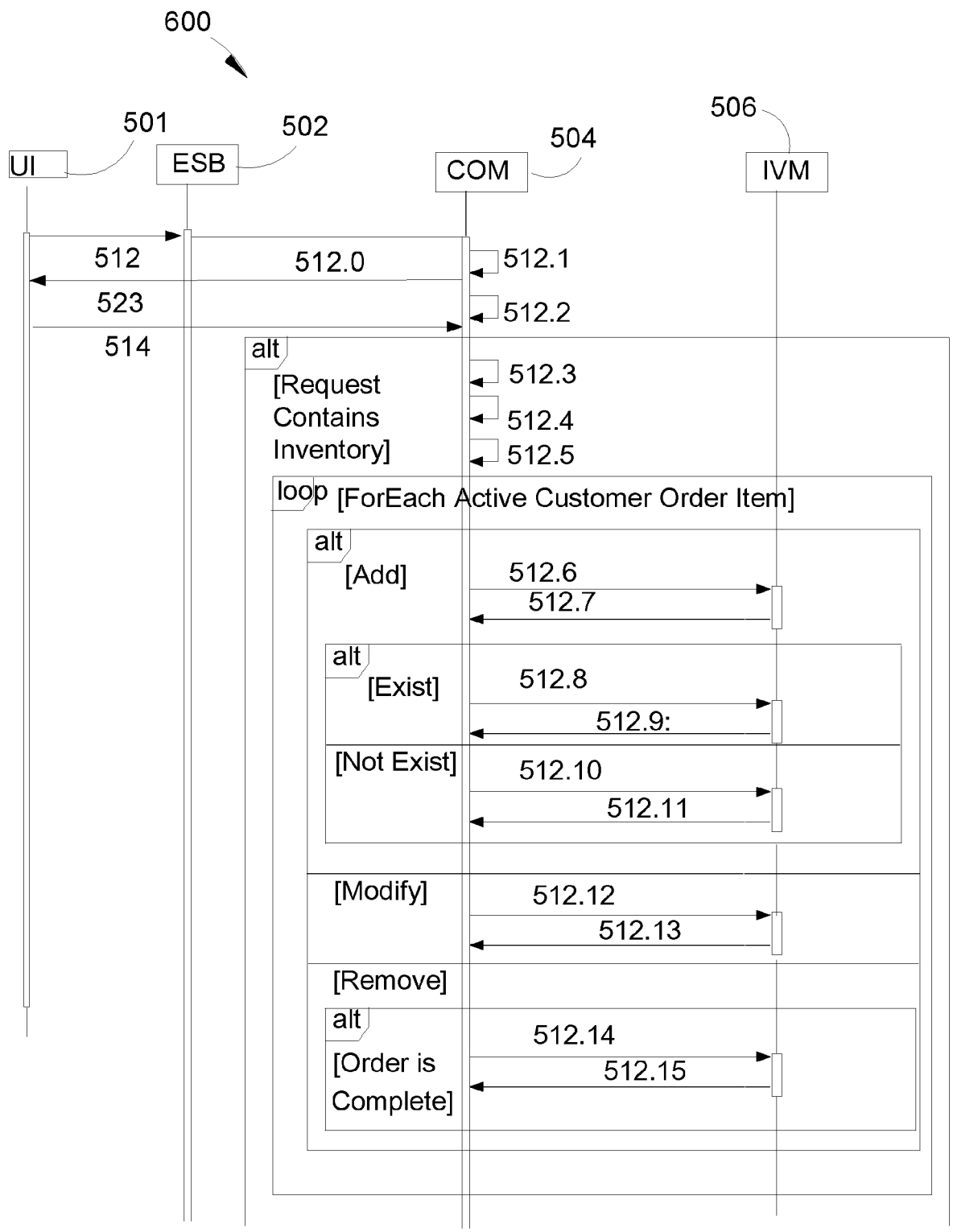
FIGS. 6A and 6B is a sequence diagram of an update-customer-order process performed by the system.
Figure 6B:
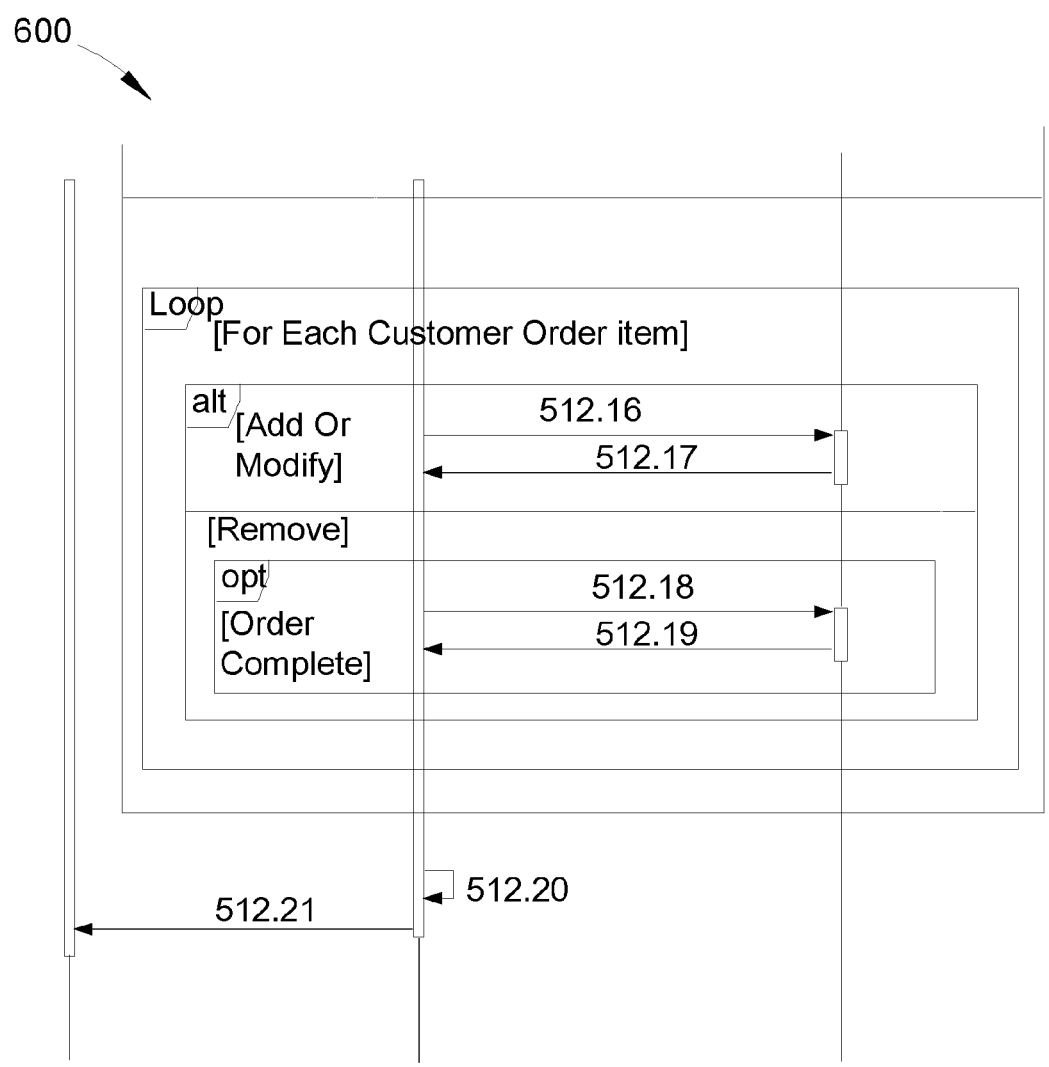

To create a customer order, or to update a customer order, the system 100 performs a create customer order process 500 as shown in FIG. 5, or an update customer order process 600 as shown in FIGS. 6A and 6B, respectively. In the processes 500 and 600, the UI component 501 (including the UI module 112) communicates with the ESB component 502 (including the ESB 124), which communicates with the COM component 504 (including the COM 136), and the COM component 504 communicates with the IVM component 506 (including the IVM 140). The "order" in these Figures refers to a data package that includes an order instance and at least one a specification instance.

As shown in FIG. 5, the create order process includes the steps of:

the UI 501 sending an order to the ESB 502 (step 508);

the ESB 502 sending a create customer order request to the COM 504 (step 510.0);

the COM 504 setting the order status to 'submitted', and setting the interaction date (510.1), and persisting the order in the order database (510.2);

in a loop, repeated for each order item that is changed, the COM 504 moving a party/place interaction to the inventory (510.3) and moving a sub item inventor to a managed entity relationship (510.4);

to add or modify the order, sending create (510.5) or update (510.7) commands to the IVM 506, and receiving respective acknowledgements (510.6, 510.8);

to delete an order, cancelling the order when it is complete;

the COM 504 then progressing the order status to 'acknowledged' (501.9), updating the customer order status (501.10), generating a notification (510.11), and sending the notification to the ESB 502 (510.12).

Figure 7:
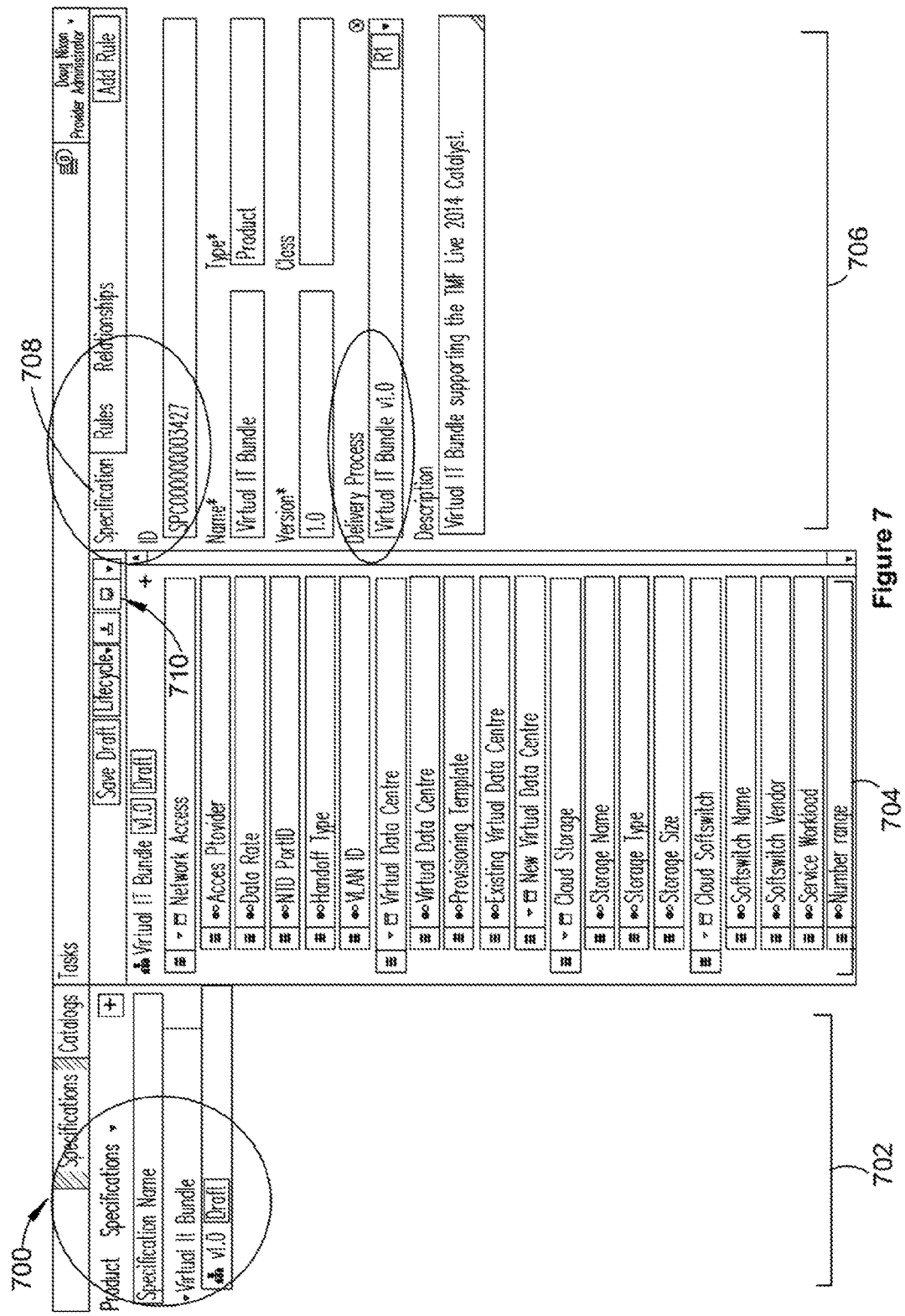

As shown in FIGS. 6A and 6B, the update customer order process 600 includes the steps of:

the UI 501 sending an update request to the ESB 502 (step 512), which passes it on to the COM 504 (step 512.0), which accesses the original customer order (512.1), and return this to the UI 501 via the ESB 502 (513);

the UI 501 sending an update request to the COM 504 via the ESB 502 (514), and the COM 504 updating the order (512.2);

if the request contains inventory, the COM 504 sets the original item to inactive, and inserts a new item (512.3), moves party and place to the inventory level (512.4), and moves sub item inventory to managed entity relationship (512.5);

in a loop for each active customer order item:
 to add an order item, the COM 504 checks with the IVM 506 for inventory existence (512.6, 512.7), and updates the inventory if it exists (512.8, 512.9), or creates the inventor if it does not exist (512.10, 512.11),
 to modify an order item, the COM 504 updates the IVM 506 (512.12, 512.13), and
 to remove an order item, the COM 504 cancels the inventory in the IVM 506 if the order is complete (512.14, 512.15);

if the request does not contain inventory, in a loop for each customer order item, the COM 504 updates the inventory status in the IVM 506 (512.17, 512.18) or cancels the inventory in the IVM 506 is the order is complete (512.18, 512.19); and the COM 504 builds a customer order notification (512.20), and sends it to the UI 501 via the ESB 502 (512.21). As shown in FIGS. 7 and 8, the user interface 700 generated by the composer component 116 includes controls that allow a user to create a new specification. The specification and version is displayed in a first, left-hand column 702. When selected, the specification's contents (including the characteristics) are displayed in a second, middle column 704. When selected, a characteristic's properties are displayed for view, or for configuration, in a third, right-hand column 706. Properties of a characteristic are entered into the contents view of the specification (right-hand column), which may be under a specification tab 708.

User Interface (UI) Module 112

The UI module 112 may provide a render control 710, as shown in FIG. 7, that when selected, controls the rendering engine 114 to process the specification data, and rules data, and to generate and send data for a order interface, as shown in FIG. 12, that includes the details of the available order as currently defined in the specification and rules. The render control 710 (which may be a button) allows a designer to rapidly switch between a design view of the product offering, and an input view as would be used by a customer to actually generate a specification instance. The order interface is provided in part by the renderer component 114.

Figure 9:
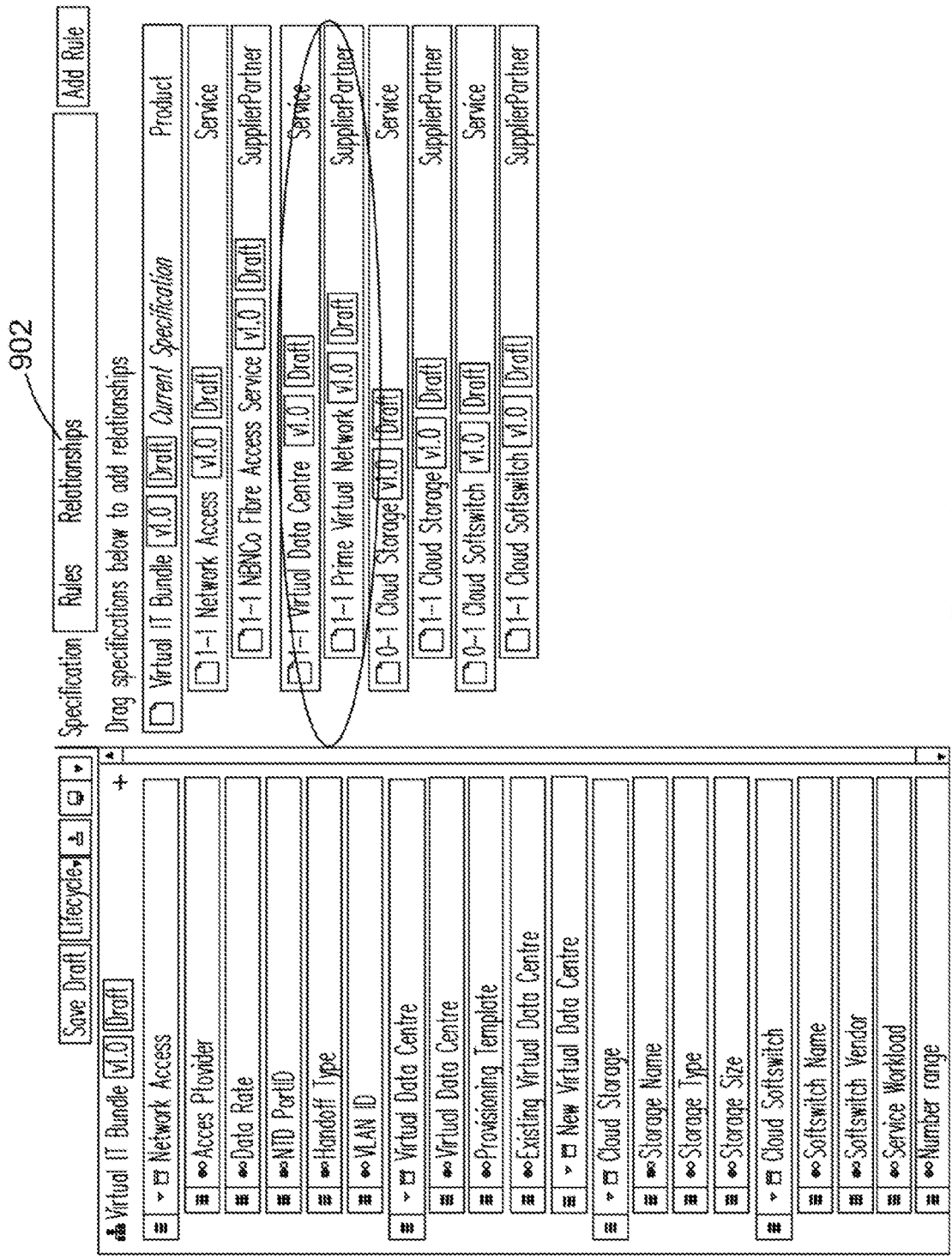

As shown in FIG. 9, the relationships of a specification can be viewed and created using a relationships view in the right-hand column under a relationships tab 902 in the user interface provided by the UI module 112.

Figure 10:
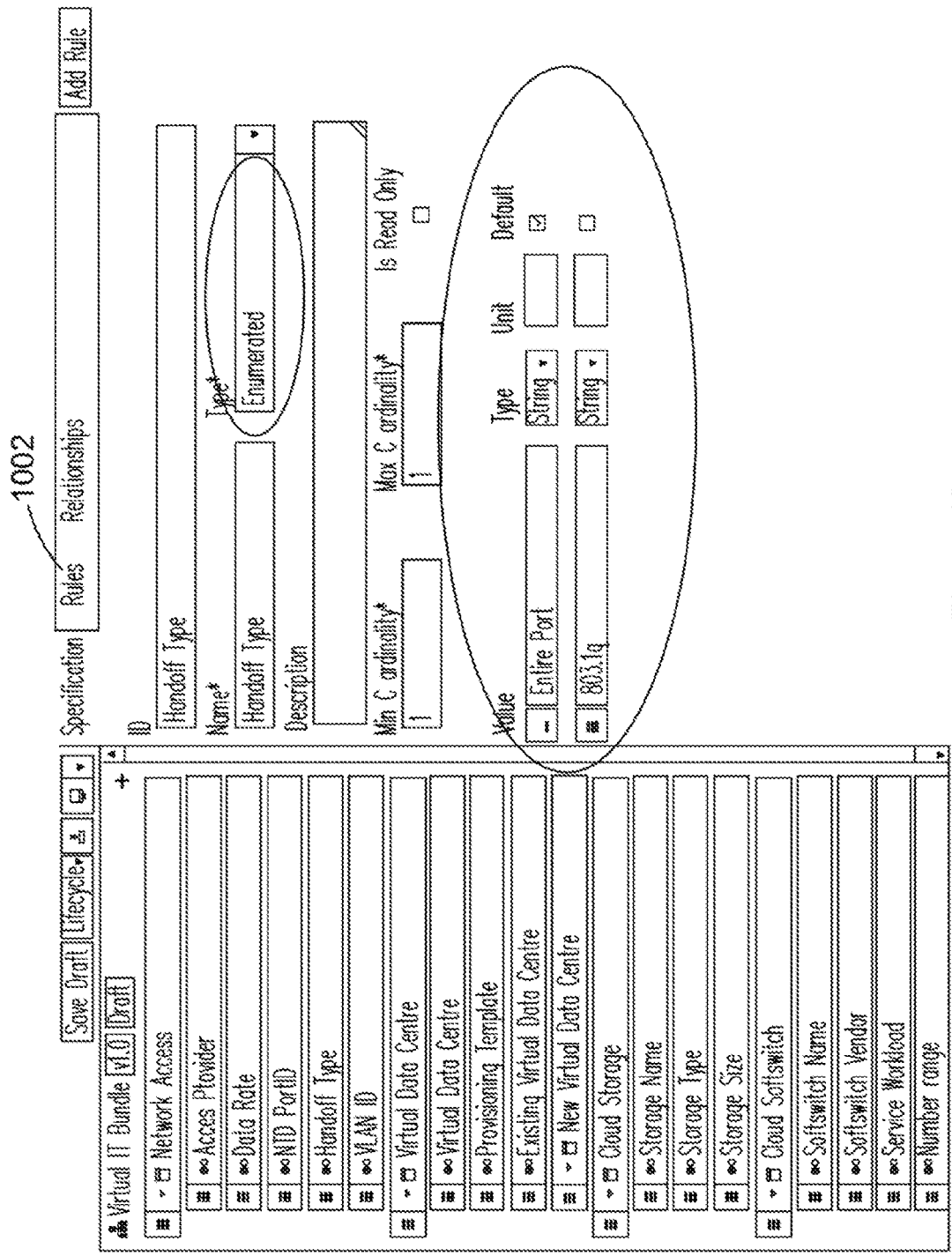
Figure 11:
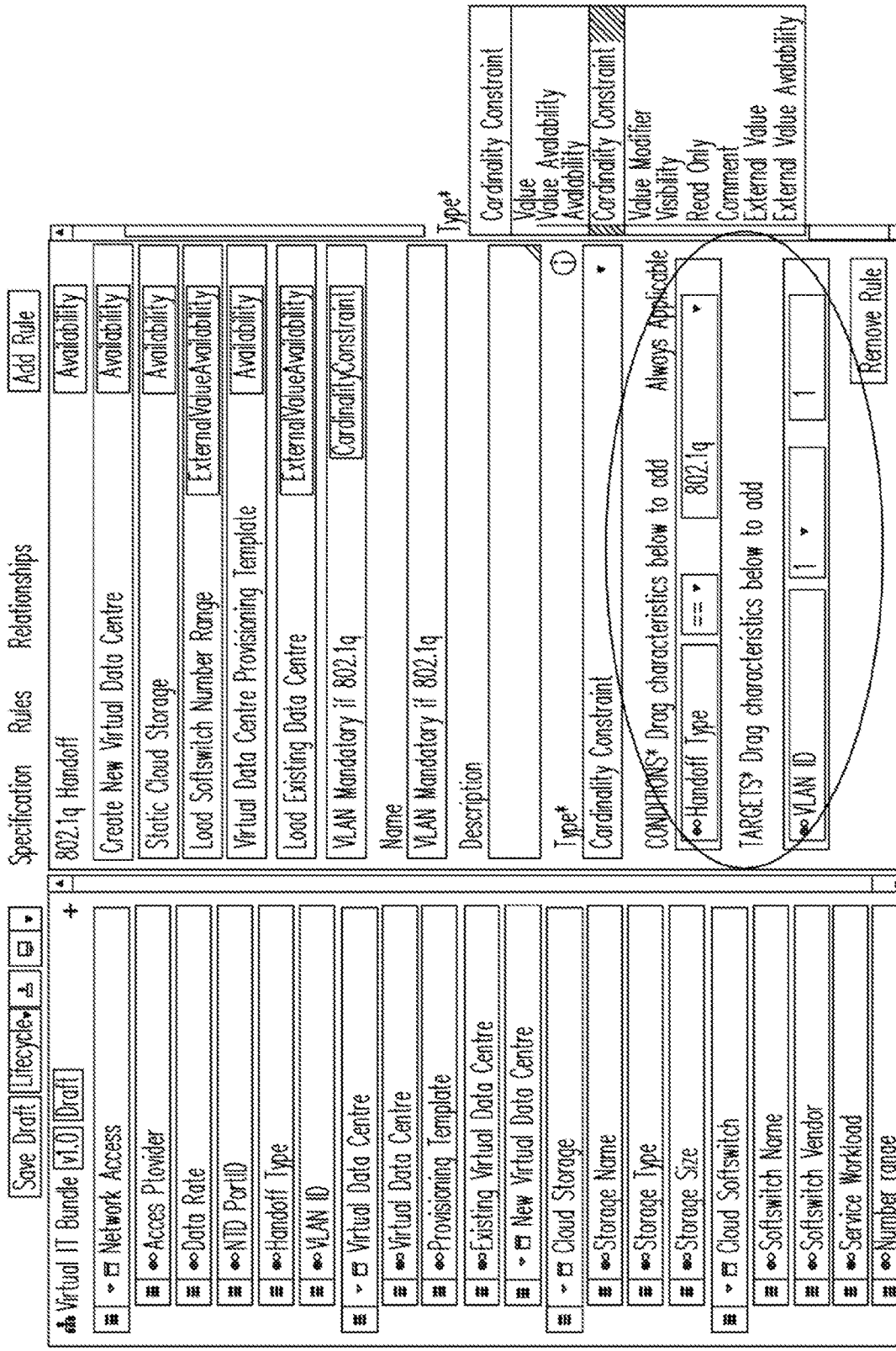

As shown in FIGS. 10 and 11, the rules associated with a specification can be displayed and edited in the right-hand column under a rules tab 1002 in the user interface.

Computer Systems

Figure 13:
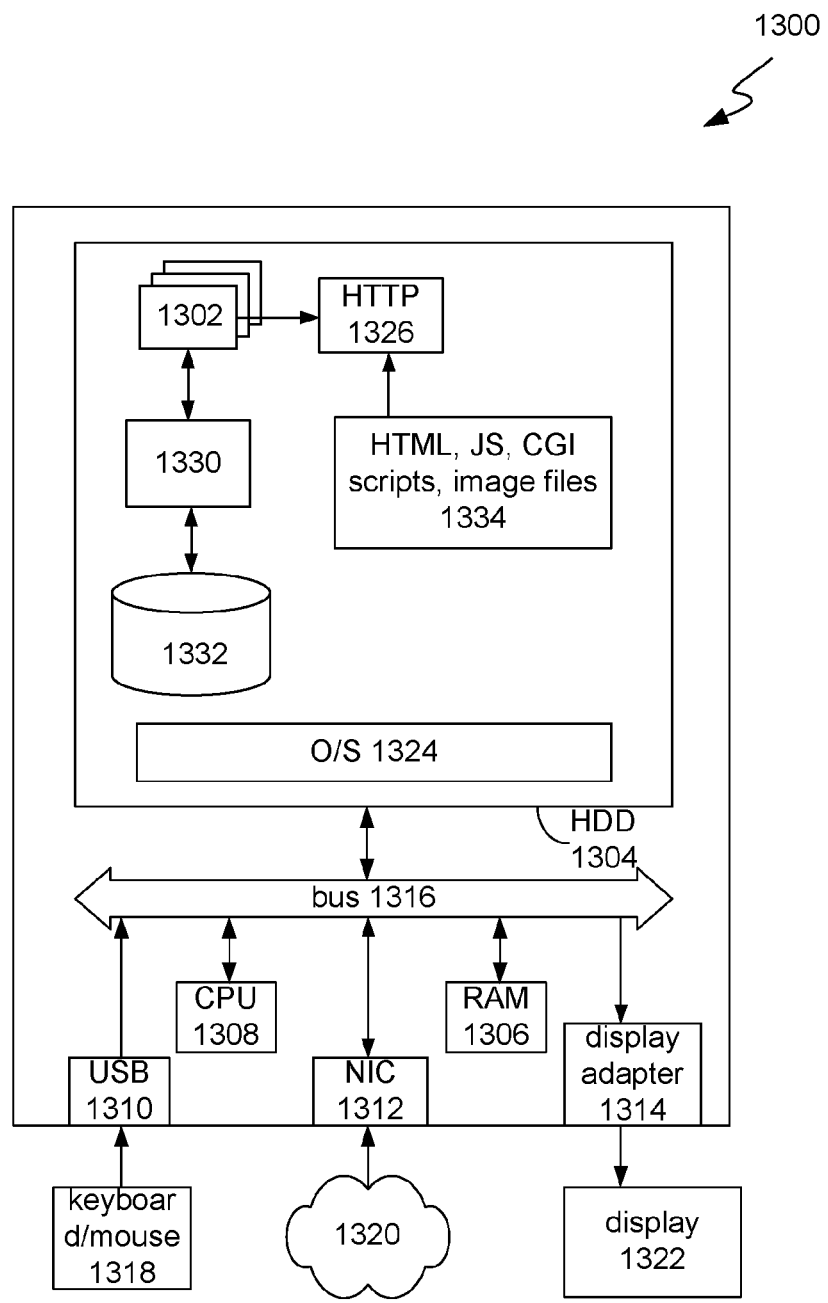
FIG. 13 is a block diagram of a computer of the product provisioning system.

FIG. 13 is a schematic block diagram of a computer system 1300 in the server 202, or in the client 204, or in both. The computer system 1300 may be based on a 32-bit or 64-bit Intel architecture, and the processes and/or methods executed or performed by the system 100 are implemented in the form of programming instructions of one or more software components or modules 1302 stored on non-volatile (e.g., hard disk) computer-readable storage 1304 associated with the computer system 1300. At least parts of the software modules 1302 could alternatively be implemented as one or more dedicated hardware components, such as application-specific integrated circuits (ASICs) and/or field programmable gate arrays (FPGAs).

The computer system 1300 includes at least one or more of the following standard, commercially available, computer components, all interconnected by a bus 1316: random access memory (RAM) 1306, at least one computer processor 1308, and external computer interfaces. The external computer interfaces include: universal serial bus (USB) interfaces 1310 (at least one of which is connected to one or more user-interface devices, such as a keyboard, a pointing device (e.g., a mouse 1318 or touchpad), a network interface connector (NIC) 1312 which connects the computer system 1300 to a data communications network such as the Internet 1320, and a display adapter 1314, which is connected to a display device Q322 such as a liquid-crystal display (LCD) panel device.

For the server 202, the computer system 1300 includes—in addition to the modules described hereinbefore (including with reference to FIG. 1B) that implement the processes described hereinbefore (including the process 400)—a plurality of standard software modules, including: an operating system (OS) 1324 (e.g., Linux or Microsoft Windows); web server software 1326 (e.g., Apache, available at http://www.apache.org); database modules 1330 (e.g., MySQL, and MongoDB), which allow data to be stored in and retrieved/accessed from one or more databases 1332, and scripts and supporting data 1334, including markup language (e.g., HTML, XML) scripts, JavaScript, and/or CGI scripts, image files, style sheets, etc. The database modules include at least one relational database management system (RDBMS), e.g., MySQL, for storing data in a relational database (e.g., the selected rulesets, and "static" data), and at least one document-oriented database (or noSQL database), e.g., MongoDB, which can be faster and more accessible for storing the dynamic documents (e.g., the specification documents and instance documents).

For the client 204, instead of a web server 1326, the computer system 1300 includes standard web browsing modules with scripting support (e.g., Google Chrome) to allow the design layer 102 to be downloaded to and executed at least in part as a web application in the computer system 1300.

The boundaries between the modules and components in the software modules 1302 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), reduced instruction set computer (RISC), firmware programmed into programmable or erasable/programmable devices, the configuration of a field-programmable gate array (FPGA), the design of a gate array or full-custom application-specific integrated circuit (ASIC), or the like.

Each of the steps of the processes of the computer system 1300 may be executed by a module (of software modules 1302) or a portion of a module. The processes may be embodied in a machine-readable and/or computer-readable medium for configuring a computer system to execute the method. The software modules may be stored within and/or transmitted to a computer system memory to configure the computer system to perform the functions of the module.

The computer system 1300 normally processes information according to a program (a list of internally stored instructions such as a particular application program and/or an operating system) and produces resultant output information via input/output (I/O) devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Example Documents

An example specification rules document can include data representing the following XML:

An example product specification instance can include XML data representing the following:

```
<ID>ORD000000887897</ID>
<AccessSeekerInteraction>
<ID>ORD000000887897</ID>
<billingAccountID>PTR000000000019</billingAccountID>
</AccessSeekerInteraction>
<description/>
<BusinessInteractionLocation/>
<BusinessInteractionRelationship/>
<Note>
<name>Order Note</name>
<description/>
<noteType>CustomerFacing</noteType>
<CreatorName>SEW</CreatorName>
<CreationDate>2013-12-09T00:43:48Z</CreationDate>
</Note>
<orderType>Connect</orderType>
<ProductOrderComprisedOf>
<quantity>
<amount>1</amount>
</quantity>
<action>ADD</action>
<AccessSeekerInteractionItem/>
<ItemInvolvesLocation>
<Place xsi:type="pla:TCFLocation">
<ID>LOC000001807002</ID>
<DescribedBy>
<value>WANGANUI</value>
<Characteristic>
<ID>Region</ID>
</Characteristic>
</DescribedBy>
<Geocode/>
<PhysicalAddress>
<StreetNumber>2</StreetNumber>
<StreetName>PORTAL</StreetName>
```

```
<SpecificationRuleset>
    <ID>Bitstream 3 Rules</ID>
    <Name>Bitstream 3 Rules</Name>
    <Version>0.1</Version>
    <AssociatedTo type="ProductSpecification">
    <ID>Bitstream 3</ID>
    <Name>Bitstream 3</Name>
    <Version>0.1</Version>
    </AssociatedTo>
    <Type>Product Specification</Type>
    <SpecificationRule>
    <Description>If Service Template is '10Mbps $190', Bandwidth will be 10Mbps and Price will be $190.00.</Description>
        <Type>ConditionalValue</Type>
        <Target>
        <Value>10</Value>
        <SpecCharacteristicPath>SpecCharacteristics.SpecCharacteristic[2]</SpecCharacteristicPath>
        </Target>
        <Target>
        <Value>190.00</Value>
        <SpecCharacteristicPath>SpecCharacteristics.SpecCharacteristic[3]</SpecCharacteristicPath>
        </Target>
        <Condition>
        <Parameter>
        <SpecCharacteristicPath>SpecCharacteristics.SpecCharacteristic[0]</SpecCharacteristicPath>
        </Parameter>
        <Parameter>Equals</Parameter>
        <Parameter>10Mbps $190</Parameter>
        </Condition>
    </SpecificationRule>
</SpecificationRuleset>
```

```xml
<StreetType>STREET</StreetType>
<Suburb>XXX</Suburb>
<City>YYYYY</City>
<postcode>4500</postcode>
</PhysicalAddress>
</Place>
</ItemInvolvesLocation>
<ItemInvolvesProduct>
<name>Bitstream 2</name>
<DescribedBy>
<value>Bitstream 2 100/50 10/2.5</value>
<Characteristic>
<ID>Service Template</ID>
<name>Service Template</name>
</Characteristic>
</DescribedBy>
<DescribedBy>
<value>58.75</value>
<Characteristic>
<ID>Price</ID>
<name>Price</name>
</Characteristic>
</DescribedBy>
<DescribedBy>
<value>None</value>
<Characteristic>
<ID>Enhanced Service Level</ID>
<name>Enhanced Service Level</name>
</Characteristic>
</DescribedBy>
<DescribedBy>
<value>None</value>
<Characteristic>
<ID>Diversity</ID>
<name>Diversity</name>
</Characteristic>
</DescribedBy>
<DescribedBy>
<value/>
<Characteristic>
<ID>E-NNI Port</ID>
<name>E-NNI Port</name>
</Characteristic>
</DescribedBy>
<DescribedBy>
<value/>
<Characteristic>
<ID>End User (Customer) Details</ID>
<name>End User (Customer) Details</name>
</Characteristic>
<CharacteristicValueReferences>
<value>John Smith</value>
<Characteristic>
<ID>Customer Name</ID>
<name>Customer Name</name>
</Characteristic>
</CharacteristicValueReferences>
<CharacteristicValueReferences>
<value/>
<Characteristic>
<ID>Business Name</ID>
<name>Business Name</name>
</Characteristic>
</CharacteristicValueReferences>
<CharacteristicValueReferences>
<value>041111332</value>
<Characteristic>
<ID>Contact Number</ID>
<name>Contact Number</name>
</Characteristic>
</CharacteristicValueReferences>
<CharacteristicValueReferences>
<value/>
<Characteristic>
<ID>Alternate Contact Number</ID>
<name>Alternate Contact Number</name>
</Characteristic>
</CharacteristicValueReferences>
<CharacteristicValueReferences>
<value>false</value>
<Characteristic>
<ID>Non Building Access Point</ID>
<name>Non Building Access Point</name>
</Characteristic>
</CharacteristicValueReferences>
<CharacteristicValueReferences>
<value>false</value>
<Characteristic>
<ID>Building Owner Consent Obtained</ID>
<name>Building Owner Consent Obtained</name>
</Characteristic>
</CharacteristicValueReferences>
<CharacteristicValueReferences>
<value>false</value>
<Characteristic>
<ID>End User Location is MUC</ID>
<name>End User Location is MUC</name>
</Characteristic>
</CharacteristicValueReferences>
</DescribedBy>
<DescribedBy>
<value/>
<Characteristic>
<ID>Technical Attributes</ID>
<name>Technical Attributes</name>
</Characteristic>
<CharacteristicValueReferences>
<value>Default</value>
<Characteristic>
<ID>DHCP Relay Agent</ID>
<name>DHCP Relay Agent</name>
</Characteristic>
</CharacteristicValueReferences>
<CharacteristicValueReferences>
<value>Default</value>
<Characteristic>
<ID>PPPoE Intermediate Agent</ID>
<name>PPPoE Intermediate Agent</name>
</Characteristic>
</CharacteristicValueReferences>
<CharacteristicValueReferences>
<value>Default</value>
<Characteristic>
<ID>UNI: Speed</ID>
<name>UNI: Speed</name>
</Characteristic>
</CharacteristicValueReferences>
<CharacteristicValueReferences>
<value>Default</value>
<Characteristic>
<ID>UNI: Duplex</ID>
<name>UNI: Duplex</name>
</Characteristic>
</CharacteristicValueReferences>
<CharacteristicValueReferences>
<value>Default</value>
<Characteristic>
<ID>UNI: Encapsulation</ID>
<name>UNI: Encapsulation</name>
</Characteristic>
</CharacteristicValueReferences>
</DescribedBy>
<version>0.1</version>
<SpecifiedBy xsi:type="prd:ProductSpecification">
<ID>SPC000000000004</ID>
<type>Product Specification</type>
<category>Product Specification</category>
</SpecifiedBy>
<validFor>
<startDateTime>2013-12-09T00:43:51.083106Z</startDateTime>
</validFor>
<ProductOffering>
<ID>POF0000000000000</ID>
</ProductOffering>
</ItemInvolvesProduct>
</ProductOrderComprisedOf>
<AccessSeekerContact>
<contactName>XXX</contactName>
```

```
<emailAddress>XXX@gmail.com</emailAddress>
    </AccessSeekerContact>
  </ProductOrder>
</ManageProductOrderRequest>
...
```

Specifications and their associated instances may also be represented in JSON. Given JSON does not provide the same degree of syntactical regiment as XML some concessions need to be made (such as no direct support for XML Types). Therefore, when supporting multiple delivery channels with varying notation formats (ie. XML & JSON), XML constructs that are not easily represented in JSON may be avoided.

The following example provides a summarised approach. In this structure the JSON name is the characteristic ID and JSON value is the instance value (for a given characteristic):

```
{
    "ItemInvolvesProduct":{
    "name":"Bitstream 2",
    "DescribedBy":[
    {
    "Service Template":"Bitstream 2 100/50 10/2.5",
    "Price":"58.75",
    "Enhanced Service Level":"None",
    "Enhanced":"None",
    "Diversity":"None",
    "E-NNI Port":null,
    "End User (Customer) Details":[
    {
    "Customer Name":"John Smith",
    "Business Name":null,
    "Contact Number":"0423444332",
    "Alternate Contact Number":null,
    "Non Building Access Point":false,
    "Building Owner Consent Obtained":false,
    "End User Location is MUC":false
    }
    ],
```

```
    "Technical Attributes":[
    {
    "DHCP Relay Agent":"Default",
    "PPPoE Intermediate Agent":"Default",
    "UNI: Speed":"Default",
    "UNI: Duplex":"Default",
    "UNI: Encapsulation":"UNI: Encapsulation"
    }
    ]
    }
    ],
    "version":"0.1",
    "SpecifiedBy":{
    "ID":"SPC000000000004",
    "type":"Product Specification",
    "category":"Product Specification"
    }
    }
}.
```

An example order instance document can include the following:

```
<BusinessInteraction i:type="CustomerOrder">
    <InteractionStatus>
        <ID>LCS000000000001</ID>
    </InteractionStatus>
    <InteractionDate>2015-06-01T03:31:01.405Z</InteractionDate>
    <BusinessInteractionInvolves>
        <PartyInteractionRole>
            <InteractionRoleType>Submitter</InteractionRoleType>
            <PartyRole>
                <ID>PTR000000011068</ID>
            </PartyRole>
        </PartyInteractionRole>
        <PartyInteractionRole>
```

<InteractionRoleType>CommerciallyResponsible</InteractionRoleType>

```
            <PartyRole>
                <ID>PTR000000020041</ID>
            </PartyRole>
        </PartyInteractionRole>
    </BusinessInteractionInvolves>
    <BusinessInteractionComprisedOf>
        <BusinessInteractionItem i:type="CustomerOrderItem">
            <Action>Add</Action>
            <ItemInvolvesLocations>
                <PlaceInteractionRole>
                    <InteractionRoleType>ServiceAccessTo</InteractionRoleType>
                    <Place>
                        <ID>0010000000HA67C</ID>
                    </Place>
                </PlaceInteractionRole>
            </ItemInvolvesLocations>
            <ItemInvolvesInventoryEntities>
                <InventoryEntity i:type="Product">
                    <DescribedBy>
                        <CharacteristicValue>
                            <Value>John Doe</Value>
                            <Characteristic>
                                <ID> serviceProviderDetails applicantName </ID>
                                <Name> Applicant Name </Name>
                            </Characteristic>
                            <SpecCharValueInstantiatedAs>
                                <ValueType>String</ValueType>
                            </SpecCharValueInstantiatedAs>
                        </CharacteristicValue>
```

```
                    <CharacteristicValue>
                        <Value>0405783789</Value>
                        <Characteristic>
                            <ID> serviceProviderDetails contactNumber </ID>
                            <Name> ContactNumber </Name>
                        </Characteristic>
                        <SpecCharValueInstantiatedAs>
                            <ValueType>DateTime</ValueType>
                        </SpecCharValueInstantiatedAs>
                    </CharacteristicValue>
                </DescribedBy>
                <SpecifiedBy>
                    <ID>SPC000000008242</ID>
                    <Type>Product</Type>
                </SpecifiedBy>
                <ManagedEntityRelationships/>
                <PartyInteractionRoles/>
                <PlaceInteractionRoles/>
                <OfferingDescribes>
                    <ID>PRO000000005077</ID>
                </OfferingDescribes>
                <ExternalReferences/>
            </InventoryEntity>
        </ItemInvolvesInventoryEntities>
    </BusinessInteractionItem>
</BusinessInteractionComprisedOf>
<DescribedBy/>
<SpecifiedBy>
    <ID>SPC000000000002</ID>
</SpecifiedBy>
<Notes></Notes>
<ExternalReferences/>
<OrderCategory>Product</OrderCategory>
<OrderType>New</OrderType>
<CustomerReference>A2L</CustomerReference>
</BusinessInteraction>
```

An example product specification document can include the following:

```
<Specification xmlns="http://schemas.dgit.biz/telflow/cim/v3"
xmlns:xsi="http://www.w3.org/2001/XMLSchema-instance">
    <ID>SPC000000000163</ID>
    <Name>Broadband New Connection</Name>
    <Description>Broadband New Connection<Description>
    <Version>2.0</Version>
    <DescribedBy />
    <Alias>NewConnectionProduct</Alias>
    <Type>Service</Type>
    <Status>Published</Status>
    <SpecCharacteristics>
        <SpecCharacteristic>
            <ID>serviceProviderDetails</ID>
            <Name>Service Provider Details</Name>
            <Description><Description>
            <Type>Collection</Type>
            <ReadOnly>false</ReadOnly>
            <MinCardinality>1</MinCardinality>
            <MaxCardinality>1</MaxCardinality>
            <SpecCharacteristicValues />
            <SpecCharacteristicRelationships>
                <SpecCharacteristicRelationship>
                    <SpecCharacteristic>
                        <ID>serviceProviderDetails applicantName</ID>
                        <Name>Applicant Name</Name>
                        <Description>we will set the applicantName value to a single value</Description>
                        <Type>KeyValue</Type>
                        <ReadOnly>false</ReadOnly>
                        <MinCardinality>1</MinCardinality>
                        <MaxCardinality>1</MaxCardinality>
                        <SpecCharacteristicValues>
                            <SpecCharacteristicValue>
                                <Value />
                                <ValueType>String</ValueType>
                                <DefaultValue>Vodafone Wholesale</DefaultValue>
```

```
                <Default>false</Default>
                <SpecCharValueRelationships />
            </SpecCharacteristicValue>
        </SpecCharacteristicValues>
        <SpecCharacteristicRelationships />
        <DisplayFormat />
    </SpecCharacteristic>
                </SpecCharacteristicRelationship>
            </SpecCharacteristicRelationships>
            <DisplayFormat />
        </SpecCharacteristic>
        <SpecCharacteristic>
            <ID>customerDetails</ID>
            <Name>Customer Details</Name>
            <Description></Description>
            <Type>Collection</Type>
            <ReadOnly>false</ReadOnly>
            <MinCardinality>0</MinCardinality>
            <MaxCardinality>1</MaxCardinality>
            <SpecCharacteristicValues />
            <SpecCharacteristicRelationships>
                <SpecCharacteristicRelationship>
                    <SpecCharacteristic>
                        <ID>customerDetails_firstName</ID>
                        <Name>First Name</Name>
                        <Type>KeyValue</Type>
                        <ReadOnly>false</ReadOnly>
                        <MinCardinality>0</MinCardinality>
                        <MaxCardinality>1</MaxCardinality>
                        <SpecCharacteristicValues>
                            <SpecCharacteristicValue>
                                <Value />
                                <ValueType>String</ValueType>
                                <Default>false</Default>
                                <SpecCharValueRelationships />
                            </SpecCharacteristicValue>
                        </SpecCharacteristicValues>
                        <SpecCharacteristicRelationships />
                        <DisplayFormat />
                    </SpecCharacteristic>
                </SpecCharacteristicRelationship>
            </SpecCharacteristicRelationships>
            <DisplayFormat />
        </SpecCharacteristic>
    </SpecCharacteristics>
    <SpecificationRelationships />
    <SpecificationTags />
    <PartyRoleCardinalities />
    <PlaceCardinalities>
        <PlaceCardinality>
            <Type>ServiceAccessTo</Type>
            <MinCardinality>1</MinCardinality>
            <MaxCardinality>1</MaxCardinality>
        </PlaceCardinality>
    </PlaceCardinalities>
</Specification>
```

An example lifecycle document can include the following:

```
<Lifecycle>
    <ID>LCX000000000001</ID>
    <Name>Telflow Default</Name>
    <Version>1.0</Version>
    <Status>Active</Status>
    <LifecycleStates>
        <LifecycleState>
            <ID>LCS000000000001</ID>
            <Name>Acknowledged</Name>
            <Type>Start</Type>
        </LifecycleState>
        <LifecycleState>
            <ID>LCS000000000002</ID>
            <Name>In Progress</Name>
            <Type>Intermediate</Type>
        </LifecycleState>
        <LifecycleState>
            <ID>LCS000000000003</ID>
            <Name>Complete</Name>
            <Type>EndSuccess</Type>
        </LifecycleState>
        <LifecycleState>
            <ID>LCS000000000004</ID>
            <Name>Cancelled</Name>
            <Type>EndFailure</Type>
        </LifecycleState>
    </LifecycleStates>
    <LifecycleTransitions>
        <LifecycleTransition>
            <Name>Submit</Name>
            <Output>
                <ID>LCS000000000001</ID>
                <Name>Acknowledged</Name>
                <Type>Start</Type>
```

```
        </Output>
        <PartyRoleTypes>
            <PartyRoleType>Customer</PartyRoleType>
            <PartyRoleType>Provider</PartyRoleType>
            <PartyRoleType>System</PartyRoleType>
        </PartyRoleTypes>
    </LifecycleTransition>
    <LifecycleTransition>
        <Name>Accept</Name>
        <Input>
            <ID>LCS000000000001</ID>
            <Name>Acknowledged</Name>
            <Type>Start</Type>
        </Input>
        <Output>
            <ID>LCS000000000002</ID>
            <Name>In Progress</Name>
            <Type>Intermediate</Type>
        </Output>
        <PartyRoleTypes>
            <PartyRoleType>Provider</PartyRoleType>
            <PartyRoleType>System</PartyRoleType>
        </PartyRoleTypes>
    </LifecycleTransition>
    <LifecycleTransition>
        <Name>Complete</Name>
        <Input>
            <ID>LCS000000000002</ID>
            <Name>In Progress</Name>
            <Type>Intermediate</Type>
        </Input>
        <Output>
            <ID>LCS000000000003</ID>
            <Name>Complete</Name>
            <Type>EndSuccess</Type>
        </Output>
        <PartyRoleTypes>
            <PartyRoleType>Provider</PartyRoleType>
            <PartyRoleType>System</PartyRoleType>
        </PartyRoleTypes>
    </LifecycleTransition>
    <LifecycleTransition>
        <Name>Cancel</Name>
        <Input>
            <ID>LCS000000000001</ID>
            <Name>Acknowledged</Name>
            <Type>Start</Type>
        </Input>
        <Output>
            <ID>LCS000000000004</ID>
            <Name>Cancelled</Name>
            <Type>EndFailure</Type>
        </Output>
        <PartyRoleTypes>
            <PartyRoleType>Customer</PartyRoleType>
            <PartyRoleType>Provider</PartyRoleType>
            <PartyRoleType>System</PartyRoleType>
        </PartyRoleTypes>
    </LifecycleTransition>
<LifecycleTransitions>
</Lifecycle>
```

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The invention claimed is:

1. A computer-implemented process for defining a telecommunications product in accordance with a predefined data schema, the process including the steps of:

receiving, by a design layer and via a first user interface, a request from a designer to generate a specification for the telecommunications product;

receiving, by the design layer and via the first user interface, characteristics data representing one or more characteristics for the specification from the designer, including a plurality of properties for at least one of the characteristics, wherein the characteristics for the specification define a plurality of fillable data fields for accepting user input data, and wherein the properties of the characteristics define what data values are acceptable in the fillable data fields;

receiving, by the design layer and via the first user interface, input rules data representing at least one rule for the specification, including:
  a selection of at least one of the received characteristics to provide a condition characteristic for the rule to operate,
  a selection of a rule type to define operation of the rule, and
  a selection of at least one of the received characteristics to provide a target characteristic on which the rule will operate;

processing, by the design layer, the characteristics data and the input rules data, according to the predefined data schema, to generate specification data representing a machine-readable specification document including the plurality of fillable data fields, and output rules data representing an associated machine-readable rules document including rules for filling the fillable data fields, such that the characteristics data and the output rules data are useable together to generate order interface data representing an order interface for a customer to request the product;

storing of the specification document separately from the corresponding rules document so they can be accessed and used separately;

receiving, at a front end of a system that includes a service layer communicatively connected to the design layer, a selection of a product offering defined by the specification document and the corresponding rules document;

based on the selection, loading, by the service layer, the specification document and the rules document;

dynamically rendering, by the service layer implemented in a code library, a second user interface based on dynamically interpreting at least the specification document and the rules document together, wherein the second user interface includes the plurality of fillable data fields;

receiving, by the service layer via the second user interface, order data from a customer in the fillable data fields;

generating, by the service layer and while the order data is being received, instance data representing an instance document including the order data and data automatically generated by processing the order data according to the rules in a rules engine, such that the instance data include data values but not corresponding data types, wherein the instance document defines an order from the customer for the telecommunications product;

validating, by the service layer, the instance data representing the instance document against the specification data and the rules data in the front end of the system;

based on validating the instance data in the front end, transmitting the instance data to a back end of the system;

validating the instance data representing the instance document against the specification data and the rules data in the back end of the system to check that the instance data was not corrupted during transmission, wherein the backend is separate from the front end;

storing, at the back end of the system and separately from the specification document, the validated instance data with an associated ID that associates the instance with the specification document;

generating, by an orchestration layer, product component data representing product components for the telecommunications product for provisioning the telecommunications product;

automatically receiving, by a plurality of connector interface layers, portions of the instance data according to the predefined data schema; and generating, by the plurality of connector interface layers, configurations for the product components that are required to provision the telecommunications product to the customer.

2. The process of claim 1, including the step of using the specification data to render the order interface for the product.

3. The process of claim 1, including the steps of:
receiving a selection of at least one relationship for one of the characteristics, wherein the relationship specifies a different previously defined product specification;
displaying the relationship; and
generating relationships data defining the relationship.

4. The process of claim 1, including the step of decomposing an instance of an order, generated based on the specification data, the rules data and relationships data, to generate decomposed order data representing a plurality of telecommunications services which may be provided by a supplier according to known standards.

5. The process of claim 1, including generating the specification document and the rules document using the predefined data schema such that the specification document and the rules document comply with the data schema.

6. The process of claim 5, including validating the generated specification document, the generated rules document, and the generated instance document with the data schema.

7. The process of claim 1, including using a rendering engine to display the instance data in context using the associated specification data.

8. The process of claim 1, including updating status data representing a lifecycle status of an instance document based on user input, wherein the lifecycle status is selected from a plurality of predefined statuses in a lifecycle document associated with the associated specification.

9. The process of claim 1, wherein:
the second user interface is displayed within a web browser;
the browser loads the specification document and the rules document; and
the browser processes the user input data according to the rules in a rules engine; and
the browser performs the validation of the instance data at the front end.

10. The process of claim 1, further comprising:
receiving a request to load the stored instance data for display;
in response to receiving the request, loading the instance data and the specification data according to the associated ID, but not loading the rules data; and
based on the loaded specification, displaying the second user interface including the stored instance data.

11. The process of claim 10, further comprising:
receiving a user input to edit the loaded instance data; and
in response to the user input to edit, loading the rules data.

12. A computer program product comprising one or more non-transitory computer storage media having stored thereon computer-executable instructions that, when executed by one or more processors of a computing system, cause the computing system to perform the process of:
receiving, by a design layer and via a first user interface, a request from a designer to generate a specification for the telecommunications product;
receiving, by the design layer and via the first user interface, characteristics data representing one or more characteristics for the specification from the user, including a plurality of properties for at least one of the characteristics, wherein the characteristics for the specification define a plurality of fillable data fields for accepting user input data, and wherein the properties of the characteristics define what data values are acceptable in the fillable data fields;
receiving, by the design layer and via the first user interface, input rules data representing at least one rule for the specification, including:
a selection of at least one of the received characteristics to provide a condition characteristic for the rule to operate,
a selection of a rule type to define operation of the rule, and
a selection of at least one of the received characteristics to provide a target characteristic on which the rule will operate;
processing, by the design layer, the characteristics data and the input rules data, according to the predefined data schema, to generate specification data representing a machine-readable specification document including the plurality of fillable data fields, and output rules data representing an associated rules machine-readable document including rules for filling the fillable data fields, such that the characteristics data and the output rules data are useable together to generate order interface data representing an order interface for a customer to request the product; and
storing the specification document separately from the corresponding rules document so they can be accessed and used separately;
receiving, at a front end of a system that includes a service layer communicatively connected to the design layer, a selection of a product offering defined by the specification document and the corresponding rules document;
based on the selection, loading, by the service layer, the specification document and the rules document;
dynamically rendering, by the service layer implemented in a code library executed by a browser, a second user interface based on dynamically interpreting at least the specification document and the rules document together, wherein the second user interface includes the plurality of fillable data fields;
receiving, by the service layer and via the second user interface, order data from a customer in the fillable data fields;

generating, by the service layer and while the order data is being received, instance data representing an instance document including the order data and data automatically generated by processing the order data according to the rules in a rules engine, such that the instance data include data values but not corresponding data types, wherein the instance document defines an order from the customer for the telecommunications product;

validating, by the service layer, the instance data representing the instance document against the specification data and the rules data in the front end of the system;

based on validating the instance data in the front end, transmitting the instance data to a back end of the system;

validating the instance data representing the instance document against the specification data and the rules data in the back end of the system, wherein the back end is separate from the front end;

storing, at the back end of the system and separately from the specification document, the validated instance data with an associated ID that associates the instance with the specification document;

generating, by an orchestration layer, product component data representing product components for the telecommunications product for provisioning the telecommunications product;

automatically receiving, by a plurality of connector interface layers, portions of the instance data according to the predefined data schema; and generating, by the plurality of connector interface layers, configurations for the product components that are required to provision the telecommunications product to the customer.

* * * * *